United States Patent [19]
Tokuyama et al.

[11] Patent Number: 5,757,573
[45] Date of Patent: May 26, 1998

[54] MAGNETIC DISK DEVICE WITHOUT SLIDER AND HAVING MAGNETIC HEAD MOUNTED DIRECTLY ON MAGNETIC HEAD SUPPORT

[75] Inventors: Mikio Tokuyama, Tsukuba; Ryoichi Ichikawa; Noriaki Okamoto, both of Ibaraki-ken, all of Japan

[73] Assignee: Hitachi, Ltd., Tokyo, Japan

[21] Appl. No.: 284,172

[22] Filed: Aug. 2, 1994

Related U.S. Application Data

[63] Continuation of Ser. No. 888,536, May 26, 1992, Pat. No. 5,335,126.

[30] Foreign Application Priority Data

May 23, 1991 [JP] Japan .................. 3-118352

[51] Int. Cl.⁶ .................................................. G11B 21/02
[52] U.S. Cl. ........................... 360/75; 360/104; 360/105
[58] Field of Search ............................. 360/104, 103, 360/126, 75, 102, 105

[56] References Cited

U.S. PATENT DOCUMENTS

| | | | |
|---|---|---|---|
| 3,732,552 | 5/1973 | Walraven | 360/75 |
| 4,028,734 | 6/1977 | Mos | 360/104 |
| 4,081,846 | 3/1978 | Roscamp et al. | 360/103 |
| 4,669,011 | 5/1987 | Lemke | 360/103 |
| 4,774,610 | 9/1988 | Kinjo | 360/104 |
| 4,809,103 | 2/1989 | Lazzari | 360/103 |
| 4,814,906 | 3/1989 | Suzuki et al. | 360/75 |
| 5,021,906 | 6/1991 | Chang et al. | 360/103 |
| 5,065,271 | 11/1991 | Matsuura et al. | 360/126 |
| 5,130,867 | 7/1992 | Ohashi | 360/75 |
| 5,528,819 | 6/1996 | McKay et al. | 29/603.07 |

FOREIGN PATENT DOCUMENTS

| | | |
|---|---|---|
| 57-569 | 1/1982 | Japan . |
| 63-306514 | 12/1988 | Japan . |
| 2-226512 | 9/1990 | Japan . |
| 2-227813 | 9/1990 | Japan . |

*Primary Examiner*—Andrew L. Sniezek
*Attorney, Agent, or Firm*—Antonelli, Terry, Stout, & Kraus, LLP

[57] ABSTRACT

A magnetic disk device for reading information from a magnetic disk surface of a magnetic disk and for writing information on the magnetic disk surface. The magnetic disk device includes an arm disposed at a distance from the magnetic disk surface, a magnetic head support including a flexible member cantilevered to the arm, and at least one magnetic head. The flexible member has a first end attached to the arm and a second end extending toward the magnetic disk surface, and the at least one magnetic head is disposed at the second end of the flexible member. The at least one magnetic head includes a core having a gap and a coil wound around the core. The gap is disposed at a surface of the flexible member facing toward the magnetic disk surface.

40 Claims, 22 Drawing Sheets

MAGNETIC DISK DEVICE WITHOUT SLIDER AND HAVING MAGNETIC HEAD MOUNTED DIRECTLY ON MAGNETIC HEAD SUPPORT

CROSS-REFERENCE TO RELATED APPLICATION

This is a continuation of application Ser. No. 07/888,536 filed on May 26, 1992, now U.S. Pat. No. 5,335,126.

BACKGROUND OF THE INVENTION

1. Field of the Invention

The present invention relates to a magnetic disk device adapted for high-speed access to data.

2. Description of the Prior Art

Improvements in (1) enlarging storage capacity, (2) speeding up access to data, and (3) ensuring reliability have keenly been demanded in the field of magnetic disk devices. The most effective means for enlarging storage capacity is to narrow the gap between a magnetic head and a magnetic disk (usually called the flying height).

With the narrower gap between a magnetic head and a magnetic disk, however, the possibility of contact between both members is increased and so is the risk that data on magnetic disks may be destroyed due to contact damage.

Accordingly, the demands must be satisfied while preventing destruction of data on magnetic disks, to thereby ensure reliability in reading and writing data.

Because a magnetic head and a magnetic disk are made of materials which are not sufficiently resistive to sliding motion therebetween, it has been conventional to create an air film by utilizing a speed of a slider relative to the magnetic disk, mount the magnetic head on the slider flying over the magnetic disk on the air film, and fly the slider at a predetermined flying height in a stable manner. Stated otherwise, a magnetic disk device has been designed so as to avoid direct contact between the magnetic disk and the slider which may destroy data on the magnetic disk.

In order to meet the contradictory demands for preventing contact between the slider and the magnetic disk and reducing the flying height of the slider, as disclosed in Japanese Unexamined Patent Publication No. 63-306514, a conventional magnetic head slider has been arranged such that an air film is created by utilizing a speed of the slider relative to the magnetic disk, a flexible support is provided on the slider flying over the magnetic disk, and a magnetic head is mounted on the lower end of the support. The technique permits the magnetic head to come closer to the magnetic disk without reducing the flying height of the slider.

However, a reduction in the weight of moving parts which is essential to high-speed access of data has not been considered. Also, no consideration has been given to how to make the magnetic head stably follow the magnetic disk, resulting in the possibility that surges (vibrations) of the disk may cause a malfunction in recording and reproducing the data. Further, reduction of external forces acting on the flexible support, such as air flow generated during rotation of the magnetic disk, has not been taken into consideration.

In a conventional magnetic head slider of the type comprising a small-sized and light-weight slider for high-speed access, as disclosed in Japanese Unexamined Patent Publication No. 2-226512, the slider has been formed on a suspension, which serves to bias (press) a magnetic head against the magnetic disk surface, by a film forming process such as sputtering. Thus, because slider composition materials are deposited on the suspension by sputtering or the like to form the slider, there have arisen problems in ensuring the bonding strength between the slider and the suspension, ensuring the slider thickness sufficient for the mounting of the magnetic head, accompanied by difficulties in attaining vertical alignment between the floating surface of the slider and the magnetic head.

In a conventional magnetic head supporting system for a magnetic disk device with an aim of achieving high-speed access and large storage capacity, as disclosed in Japanese Unexamined Patent Publication No. 2-227813, a magnetic head has directly been formed as a thin film on a suspension. However, how to make the magnetic head stably follow a magnetic disk has not been considered in this technique such that the magnetic head cannot satisfactorily follow vibrations of the magnetic disk (such as mechanical vibration due to a motor for rotating the magnetic disk and vibration due to air flow generated by rotation of the magnetic disk). This has raised the problem of causing data read/write errors.

Also, sufficient consideration has not been given to how to ensure reliability while making the distance between the magnetic head and the magnetic disk substantially zero to attain high recording density. Therefore, problems such as abrading the magnetic head and the magnetic disk due to contact therebetween and destroying data on the magnetic disk have been encountered.

Thus, the above conventional magnetic head supporting mechanisms for magnetic disk devices have problems to be solved in (1) narrowing the gap between the magnetic head and the magnetic disk, including contact therebetween, for the purpose of large storage capacity, (2) reducing both size and weight of the slider or dispensing with the slider for the purpose of high-speed access to data, and (3) (i) preventing data from being destroyed due to contact of the slider or magnetic head with the magnetic disk, or ensuring characteristics resistive to sliding so as not to destroy data even upon the occurrence of such contact, and (ii) preventing data read/write errors due to the fact that the magnetic head cannot follow (or stably float or contact) the magnetic disk, for the purpose of satisfactory reliability. It is difficult to solve all these problems at the same time.

SUMMARY OF THE INVENTION

An object of the present invention is to solve the above-mentioned problems which have inevitably been experienced in the prior art, and to provide a magnetic disk device which ensures satisfactory reliability even when a magnetic head continuously slides on a hard magnetic disk to read/write data, and which has a supporting mechanism optimum for a multihead unit for achieving high-speed access.

To achieve the above object, the following means are provided in a magnetic head supporting mechanism of the magnetic disk device of the present invention for the purpose of high-speed access to data. Specifically, (i) a support held by a rigid arm and formed of a flexible member extending up to its free end to which a magnetic head is attached, or a support comprising in combination a rigid member and a flexible member (both types being hereinafter referred to as a support) is arranged such that the support surface facing the magnetic disk or the support itself serves as gas pressure adjusting means for adjusting gas pressure by utilization of a relative speed between the support and the magnetic disk and thus operates similarly to the slider used in the prior art. This dispenses with the slider for a reduction in the weight.

(ii) A plurality of magnetic heads are arranged on the support from the inner peripheral side toward the outer peripheral side of tracks on the magnetic disk, thereby providing means which can shorten the access distance of the magnetic head to permit high-speed access.

In the case of arranging a plurality of magnetic heads at the free end of the support, the above gas pressure adjusting means is provided in each portion of the support between adjacent magnetic heads. Further, in order to make the plurality of magnetic heads independently follow surges of the magnetic disk, cut-outs are provided on portions of the support between the adjacent magnetic heads.

Additionally, in the magnetic disk device equipped with a magnetic head supporting mechanism having a plurality of magnetic heads, magnetic head selecting means is provided to select one of the plural magnetic heads.

Ensuring reliability requires (iii) an improvement in sliding-resistant characteristics of the support mounting the magnetic head thereon and the magnetic disk, (iv) a reduction in contact force between the support mounting the magnetic head thereon and the magnetic disk, and realization of (v) stable flying of the magnetic head or (vi) stable contact. Which one of the requirements (v) and (vi) is to be selected is determined by a designer depending on the sliding-resistant characteristics of the support and the magnetic disk, as well as the term of guarantee for reliability of the magnetic disk device. With the satisfactory sliding-resistant characteristics ensured, the above requirement (vi) may be selected with the result of a drastic increase in storage capacity. In either case, the distance between the magnetic head and the magnetic disk is required to be kept constant.

As means for meeting the above requirement (v), the support is desirably formed of the following materials which exhibit superior sliding-resistant characteristics. It is also desirable that the support surface on the side mounting the magnetic head thereat and facing the magnetic disk serves as a sliding surface with the magnetic disk, and that the magnetic head is formed integral with the support on the surface opposite to the above sliding surface or on an extension of the support in a direction extending from the rigid arm holding portion to the free end of the support. Here, the term "extension of the support" means not only an area extending along the thickness of the support at its distal end, but also the end face of the support in the direction of extension thereof when the distal end of the support is bent toward the opposite side of the support surface to the magnetic disk.

Further, a core gap forming portion of the magnetic head is desirably arranged to be substantially coincident with the support surface facing the magnetic disk.

Materials having superior sliding-resistant characteristics may be (1) ferrite (including ferrite with MnZn added), (2) $Al_2O_3$, (3) an alumina-titanium composite such as $Al_2O_3$.TiC and $Al_2O_3$.$TiO_2$, (4) a zirconia-base ceramic such as $ZrO_2$ and $ZrB_2$, (5) a silicon-base ceramic such as SiC and $Si_3N_4$, (6) diamond-like carbon, (7) diamond, (8) Si, (9) $SiO_2$, etc.

As means for meeting the above requirement (iv), it is effective to dispense with the conventional slider for reducing the weight, and also (a) to form the support by using a flexible thin plate or sheet made of any one or a combination of the above sliding-resistant materials, for example, or by using a metal such as an austenite stainless steel, Al alloy and Cu alloy, a synthetic resin or a fiber-reinforced synthetic resin to make a plate having a thickness small enough to exhibit flexibility.

For adjusting the gap or the contact state between the magnetic head and the magnetic disk, (b) it is effective to form the support of a synthetic resin film incorporating a piezoelectric element and provide deforming means for deforming the synthetic resin film by application of voltage, or provide rotating means for rotating the support such that the magnetic head is pressed against the magnetic disk or moving means for moving the magnetic disk in a direction perpendicular to the magnetic disk surface, the rotating means and the moving means being coupled to the support.

Further, (c) there are provided contact detecting means for detecting any one of frequency of contact or contact force or contact pressure between the magnetic head and the magnetic disk, or rotation detecting means for detecting rotation of the magnetic disk, or means for detecting an output of the magnetic head, or dust detecting means for detecting an amount or density of dust.

Preferably, the various means explained in the above (a), (b) and (c) are employed in any suitable combination in the present invention.

As means for meeting the above requirement (v), it is desirable that the aforesaid gas pressure adjusting means is used similarly to the conventional slider, and the gas film between the magnetic disk and the magnetic head exhibits a higher pressure distribution than an average pressure in the magnetic disk device.

As means for meeting the above requirement (vi), the aforesaid gas pressure adjusting means is preferably used as a negative pressure slider which generates a lower pressure than the average pressure in the magnetic disk device.

When using the gas pressure adjusting means to meet the above requirements (v) and (vi), the support is desirably provided with a window adapted to allow part of the gas flowing between the support and the magnetic disk to escape for the purpose of suppressing fluctuations in the flying height of the magnetic head due to turbulence or the like and making the magnetic head more stably follow the magnetic disk.

As means for meeting the above requirements (iii) and (vi), in addition to the support being formed of those materials which have superior sliding-resistant characteristics, it is effective to provide a wear-resistant thin film made of any one selected from the group consisting of TiC, SiC, TiN.$MoS_2$, $Cr_2O_3$ and $Al_2O_3$ on the sliding surface of the support with the magnetic disk, or provide lubricant supplying means disposed so as to provide a lubricant between the sliding surface of the support facing the magnetic disk and the magnetic disk.

The support is in the form of a thin plate made of Si, a Si compound or the like, and means is provided for having the support serve as part of an electric circuit for the magnetic head. Alternatively, the support may be formed of a flexible printed circuit (hereinafter referred to as an FPC) on which an electric wiring from the magnetic head is incorporated. In addition, the support may be formed of a flat plate, a curved plate or a combination of the flat plate and the curved plate.

Thus, since for the purpose of achieving high-speed access to data in the magnetic disk device, the support held by a rigid arm and formed of a flexible member extending up to its free end, or the support comprising in combination a rigid member and a flexible member is arranged such that the support surface facing the magnetic disk or the support itself serves as the gas pressure adjusting means for adjusting gas pressure by utilization of a relative speed between the support and the magnetic disk, the gas pressure adjusting means creates a gas film between itself and the magnetic disk.

Since the core gap forming portion of the magnetic head is arranged to be substantially coincident with the surface of the magnetic head support facing the magnetic disk, the magnetic head can follow the magnetic disk in a like manner to the conventional case having the slider.

Accordingly, the distance between the magnetic head and the magnetic disk can be kept constant without providing the conventional slider. In addition, the slider is dispensed with to reduce the weight of moving parts so that the magnetic head can be moved to a predetermined data position on the magnetic disk at a high speed, thereby permitting high-speed access.

When the gas flow generated by rotation of the magnetic disk acts as turbulence to vibrate the magnetic head supporting mechanism, the resulting vibration can be suppressed by providing a window on a part of the supporting mechanism.

A reduction in the weight resulting from dispensing with the slider can greatly reduce the magnitude of a shock caused by possible contact between the magnetic head and the magnetic disk, so that data on the magnetic disk will not be destroyed. As a result, the distance between the magnetic head and the magnetic disk can be reduced while ensuring reliability, thereby enabling the so-called contact recording in which data is read and written under a continuously sliding condition. The reduced distance between the magnetic head and the magnetic disk also enables an increase in the storage capacity as mentioned above. Consequently, a magnetic disk device of large storage capacity and high reliability using contact recording can be provided.

Since the aforesaid various means for detecting various information during operation of the magnetic disk device are provided and the information from the detecting means is evaluated to control the contact state between the magnetic disk and the magnetic head supporting mechanism, it is possible to improve not only the service life of the magnetic disk and the magnetic head supporting mechanism, but also reliability in reading/writing magnetic information.

Since the plurality of magnetic heads are arranged on the support from the inner peripheral side to the outer peripheral side of tracks on the magnetic disk, the access distance (movement distance) of the magnetic head can be reduced to provide the magnetic disk device with a capability of higher-speed data access. Further, since a gas spring is formed between the magnetic head and the magnetic disk by each gas pressure adjusting means provided between adjacent magnetic heads, all the magnetic heads can stably follow the magnetic disks, with the result of improved reliability in recording and reproducing data.

Since a cut-out is provided in each portion of the support between adjacent magnetic heads, the respective magnetic heads can stably follow the magnetic disks in an independent manner.

In the case of arranging the plurality of magnetic heads, the effect of achieving high-speed access is enhanced by properly selecting the magnetic head used for access to data on the magnetic disk.

With the support formed of a synthetic resin film or an FPC, the weight of the support itself can be reduced, which leads to less possibility of disk damage in the magnetic disk device due to contact between the magnetic head and the magnetic disk.

By using as the support a synthetic resin film provided with a piezoelectric element and applying voltage to the piezoelectric element to control flexure of the film, the pressure of the magnetic head pressing against the magnetic disk surface can be controlled, whereby the flying height of the magnetic head or the contact pressure between the magnetic head and the magnetic disk can also be controlled. Control of the contact pressure enables the head and the disk to contact with each other under a stable and small force, with the result that abrasion therebetween is prevented to improve the sliding-resistant characteristic.

The contact pressure may be controlled by coupling one end of the support to the rotating means or the moving means for moving the magnetic disk in a direction almost perpendicular to the magnetic disk surface to control the force by which the magnetic head is pressed against the magnetic disk. Further, a contact pressure sensor, a dust sensor and a rotation sensor are provided to make the piezoelectric element, the rotating means or the vertically moving means adjust the pressing force of the magnetic head by referring to outputs of the sensors or a head output. This enables stabler and finer control of the contact pressure.

By utilizing the air pressure adjusting means as positive pressure generating means as in the conventional slider, the magnetic head can fly over the disk with the predetermined flying height. Alternatively, when the air pressure adjusting means is utilized as negative pressure generating means, it serves as suction means for stably contacting the magnetic head with the disk.

With the support made of Si or a Si compound, the support itself can be utilized as an electric circuit for the magnetic head or an amplification circuit for read/write signals. The use of Si is also advantageous in achieving easy micro processing by an ion drawing apparatus, an ion milling apparatus and the like.

The support is made of any one material or a combination of materials selected from the group consisting of (1) ferrite (including ferrite with MnZn added), (2) $Al_2O_3$, (3) an alumina-titanium composite such as $Al_2O_3.TiC$ and $Al_2O_3.TiO_2$, (4) a zirconia-base ceramic such as $ZrO_2$ and $ZrB_2$, (5) a silicon-base ceramic such as SiC and $Si_3N_4$, (6) diamond-like carbon, (7) diamond, (8) Si, and (9) $SiO_2$, which have superior sliding-resistant characteristics. Further, the support is formed as a flat plate or a curved plate having a thickness which is reduced so as to exhibit flexibility, and the support surface facing the magnetic disk serves as the sliding surface facing the magnetic disk.

By providing the magnetic head integrally with the support on the side opposite to the sliding surface or on the end face thereof, the possibility of malfunction in reading/writing data or destruction of data on the magnetic disk due to abrasion between the magnetic head and the magnetic disk can be eliminated even when the distance between the magnetic head and the magnetic disk is made substantially zero. This is because the support itself serves as a surface sliding on the magnetic disk to dispense with the slider and only the weight of the magnetic head can be lessened, making it possible to reduce the contact pressure between the magnetic head and the magnetic disk.

By providing the wear-resistant thin film made of a material selected from the group consisting of TiC, SiC, $TiN.MoS_2$, $Cr_2O_3$ and $Al_2O_3$ on the surface of the support sliding on the magnetic disk, or supplying a lubricant to the gap or interface between the sliding surface of the support and the magnetic disk, there can be provided the magnetic disk device with the support having improved wear resistance.

Other features and advantages of the present invention will be apparent from the embodiments described in detail below.

DETAILED DESCRIPTION OF THE PREFERRED EMBODIMENTS

Figure 1:
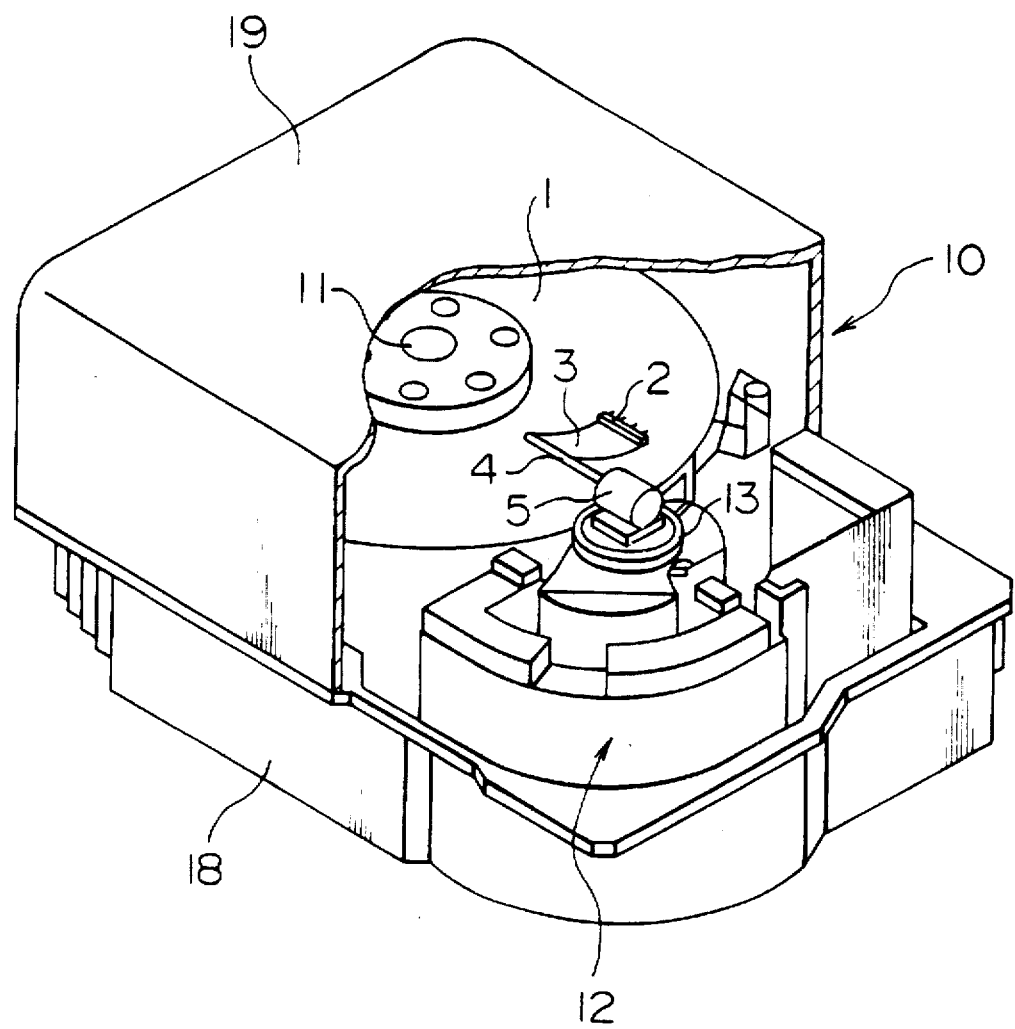
FIG. 1 is a perspective view, partly sectioned, of a magnetic disk device of a first embodiment of the invention.

A first embodiment of the invention will be described with reference to FIGS. 1 to 14. FIG. 1 is a perspective view, partly sectioned, of a magnetic disk device 10 according to the first embodiment of the present invention.

The magnetic disk device 10 of this embodiment comprises, as primary parts, a magnetic disk 1 fixed to a spindle shaft 11 and rotating together with rotation of the spindle shaft 11, an actuator 12 having a carriage shaft 13 fixed thereto, rotating means 5 fixed to the carriage shaft 13, a rigid arm 4 directly coupled to the rotating means 5, a support 3 held by the rigid arm 4 and comprising a flexible member extending up to its free end, a magnetic head 2 arranged at or near the free end of the support 3, as well as a cover A 18 and a cover B 19 for housing and protecting these components.

Figure 2:
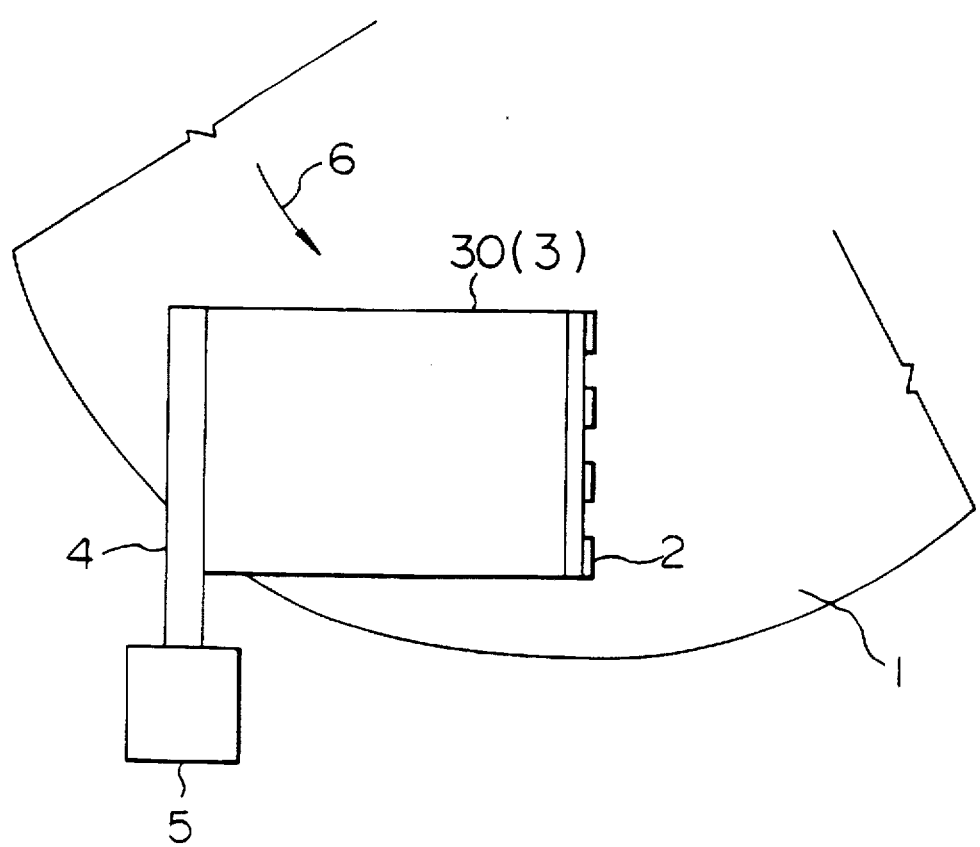
FIG. 2 is a front view of a magnetic head supporting mechanism of the first embodiment.
Figure 3:
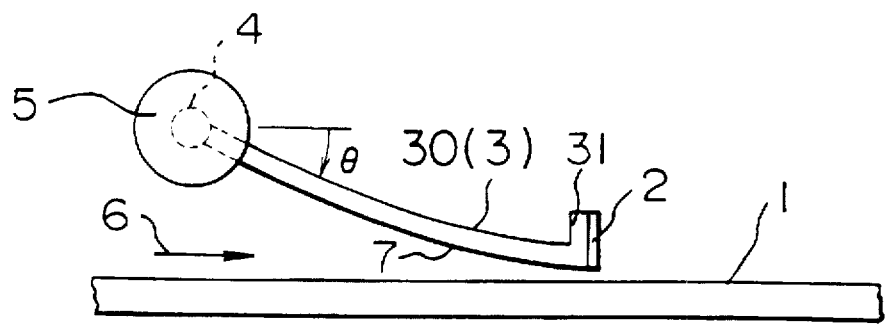
FIG. 3 is a side view of the magnetic head supporting mechanism of the first embodiment.
Figure 4:
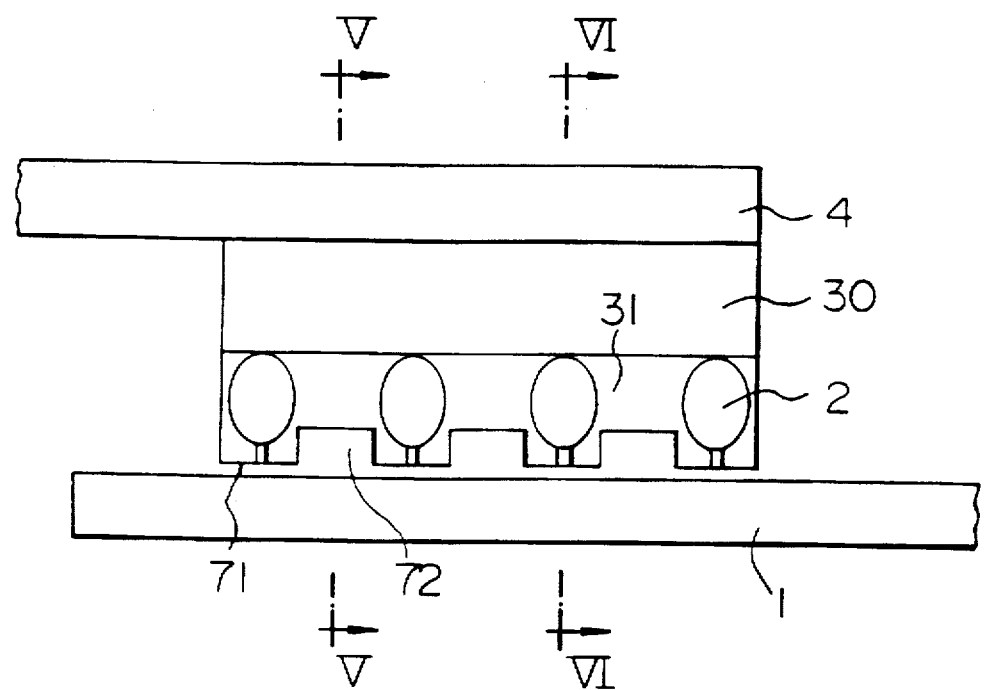
FIG. 4 is a side view, as viewed from the magnetic head side, of the magnetic head supporting mechanism of the first embodiment.

FIG. 2 is a front view showing the entirety of a magnetic head supporting mechanism, comprising the rigid arm 4, the support 3 and the magnetic head 2, according to this embodiment. FIG. 3 is a side view of the magnetic head supporting mechanism as viewed along the axis of the rigid arm 4, and FIG. 4 is an enlarged view of the magnetic head supporting mechanism as viewed from the magnetic head side.

The magnetic head in this embodiment is formed on the free end of the support such that a core gap forming portion of the magnetic head is arranged to be substantially coincident with the surface of the support facing the magnetic disk.

The support has rigidity in a direction parallel to said magnetic disk surface and flexibility in a direction non-parallel to said magnetic disk and is formed into a curve shape so that it can easily flex upon application of a pressing load to cause the magnetic head provided on the support to contact or separate from the magnetic disk. However, the support can precisely position the magnetic head radially on the magnetic disk because it is rigid in a direction parallel to the magnetic disk surface.

As shown in FIGS. 2 and 3, the magnetic head 2 is supported on one end of the support in an opposing relation to the magnetic disk 1, and the other end of the support is held by the rigid arm 4 having a high rigidity. The rigid arm 4 is coupled to the rotating means 5 so that the rigid arm is rotated to bring the magnetic head into or out of contact with the magnetic disk. An arrow 6 indicates a direction of rotation of the magnetic disk.

While this embodiment is illustrated as mounting four magnetic heads from the inner peripheral side to the outer peripheral side of the magnetic disk, the number of magnetic heads is not limited.

As shown in FIG. 3, the support is mounted to form an angle of θ with respect to the plane parallel to the magnetic disk surface. Assuming that an initial angle between the plane parallel to the magnetic disk surface and the support attached to the rigid arm is $\theta_0$ and the magnetic head comes into contact with the magnetic disk with a small force, the support is elastically deformed in the case of $\theta > \theta_0$, thereby producing a pressing force W by which the magnetic head is pressed against the magnetic disk. The pressing force W is determined by a spring constant K of the support and the rotational angle θ as given when the magnetic head is mounted. K and θ are variables depending on the length of the support.

Since this embodiment is set to meet $\theta > \theta_0$, the support also serves as a suspension for pressing the magnetic head against the magnetic disk. Therefore, the support 3 will be herein referred to as a suspension 30. The magnetic head 2 is mounted on a magnetic head mounting portion 31 provided on one end of the suspension 30 and bent almost perpendicularly with respect to the magnetic disk surface. Gas pressure adjusting means 7 is formed on the surface of the magnetic head mounting portion 31 facing the magnetic disk 1 to be integral therewith such that the suspension 30 exhibits in itself a pressure adjusting function.

Note that although this embodiment will be explained by taking air as an example of a gas surrounding the magnetic disk and the support mounting the magnetic head thereon, a similar operating effect can also be obtained by other gases. With this in mind, the gas pressure adjusting means will be referred to as air pressure adjusting means below.

Figure 5:
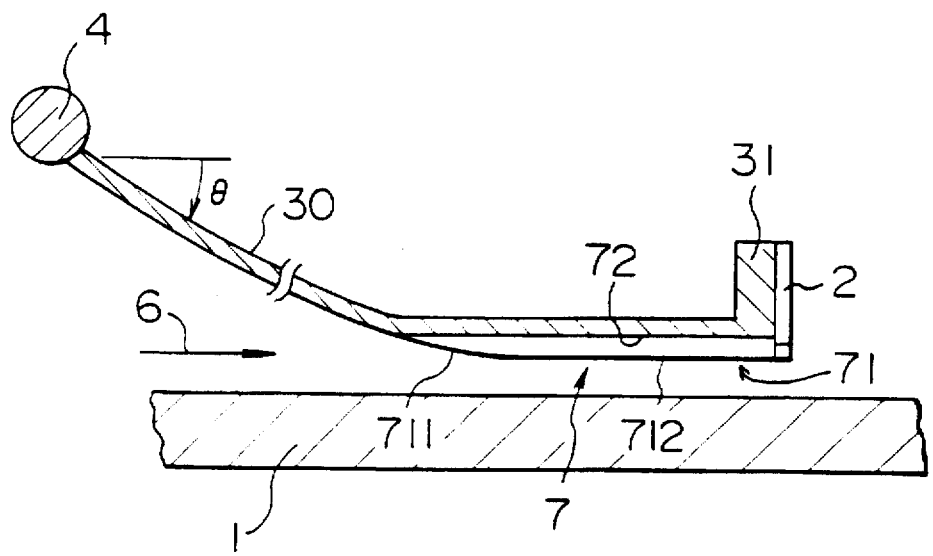
FIG. 5 is a cross-sectional view taken along the line V—V in FIG. 4.

In this embodiment, as shown in FIG. 4, the air pressure adjusting means 7 is constituted by a positive pressure generating portion 71 and a bleed portion 72. FIG. 5 shows a cross-section taken along the line V—V in FIG. 4. The positive pressure generating portion 71 comprises a tapered portion (sloped plane) 711 and a flat portion (flat plane) 712. The bleed portion 72 comprises a flat plane spaced at least several ten to several hundred micrometers from the flat portion 712 in a direction away from the magnetic disk. The positive pressure generating portion 71 is also generally called a floating surface. Here, positive pressure means a pressure higher than atmospheric pressure (1 atm).

While the suspension 30 has a larger thickness on the side where the air pressure adjusting means 7 is provided than on the side where the rigid arm is mounted in order to increase rigidity on the former side, it may have a uniform thickness from the rigid arm attaching portion to the free end.

Figure 6:
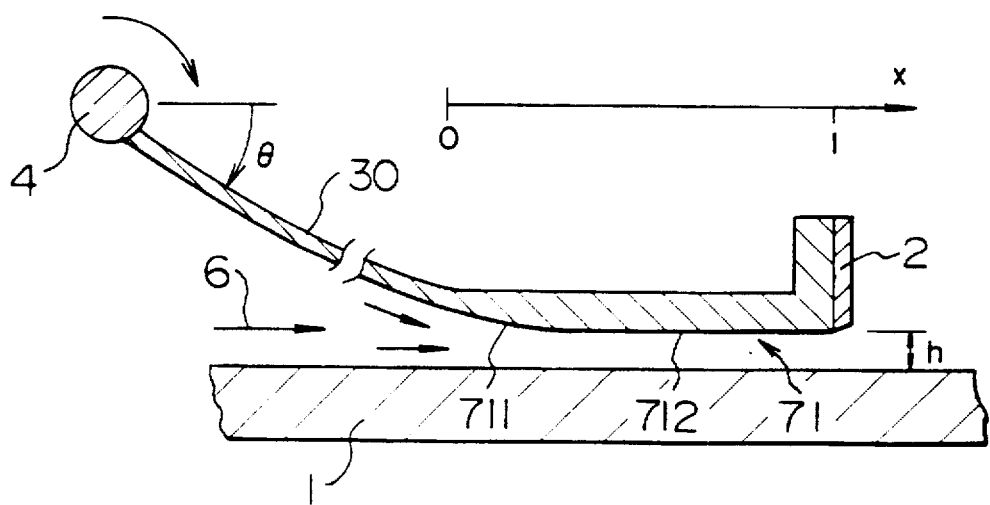
FIG. 6 is a cross-sectional view taken along the line VI—VI in FIG. 4.

FIG. 6 shows a cross-section of the positive pressure generating portion taken along the line VI—VI in FIG. 4. As disclosed in Japanese Patent Examined Publication No. 57-569, for example, an air flow generated by rotation of the magnetic disk is introduced to a narrow gap between the positive pressure generating portion and the rotating magnetic disk so that a positive pressure distribution is created as shown in FIG. 7 based on the principles of dynamic air bearing.

Figure 7:
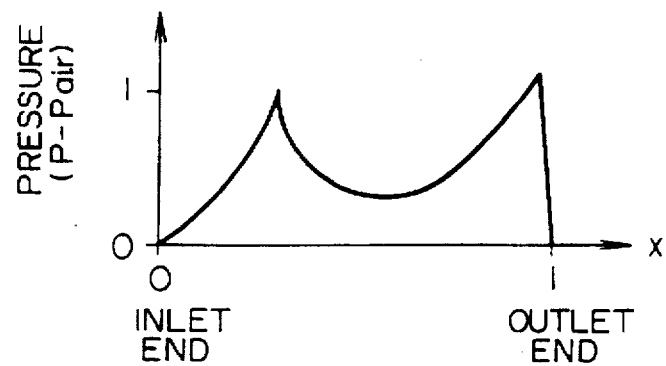
FIG. 7 is a graph showing pressure a distribution between a positive pressure generating portion and a disk.

In FIG. 7, the abscissa represents positions in a lengthwise direction of the positive pressure generating portion 71 and the ordinate represents differential pressure (gauge pressure) from the atmospheric pressure (Pair) The created positive pressures act to move the magnetic head away from the magnetic disk surface.

Accordingly, the distance h between the magnetic head and the magnetic disk (hereinafter referred to as the flying height) is given by a position where the pressing load W due to the suspension 30 is balanced with the sum (integrated value) of the positive pressures. Therefore, the smaller the flying height h the larger the load W, but the larger the flying height h the smaller the load W. Also, the larger the flying height h the larger the sum of the positive pressures, but the smaller the flying height h the smaller the sum of the positive pressures.

Figure 8:
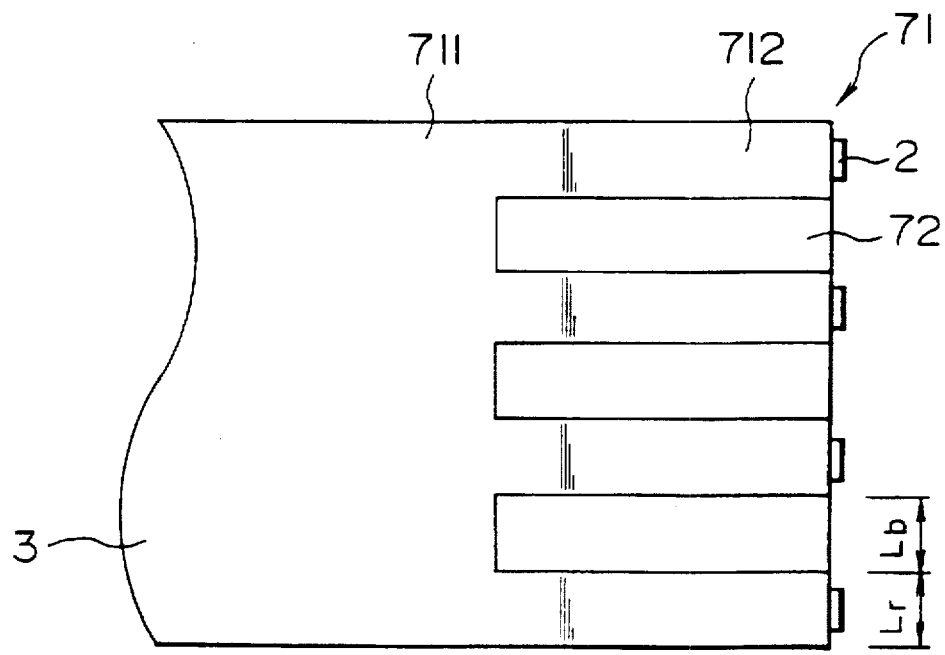
FIG. 8 is an overall view of air pressure adjusting means.

FIG. 8 shows an overall view of the air pressure adjusting means as viewed from the disk surface. As shown, the bleed portion 72 and the positive pressure generating portion 71 are alternately formed. Since the bleed portion 72 is spaced at least several ten to several hundred micrometers from the flat portion 712 as stated before, the bleed portion 72 will not produce positive pressure. Accordingly, by increasing the width Lb of the bleed portion, i.e., by reducing the width Lr of the positive pressure generating portion, the integrated value of the positive pressures is reduced and so is the flying height h. In other words, the flying height h can be changed depending on the width Lr of the positive pressure generating portion.

Figure 9:
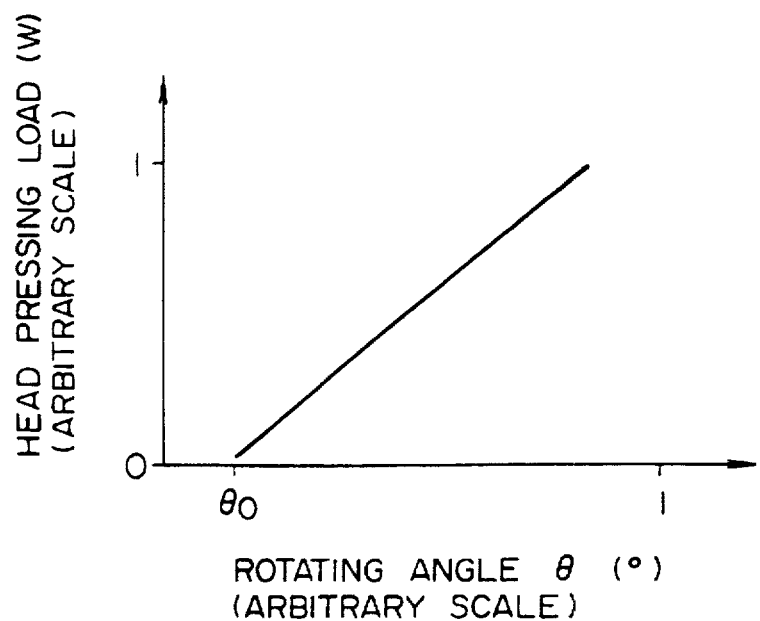
FIG. 9 is a graph showing the relationship between a rotational angle θ and a head pressing load.
Figure 10:
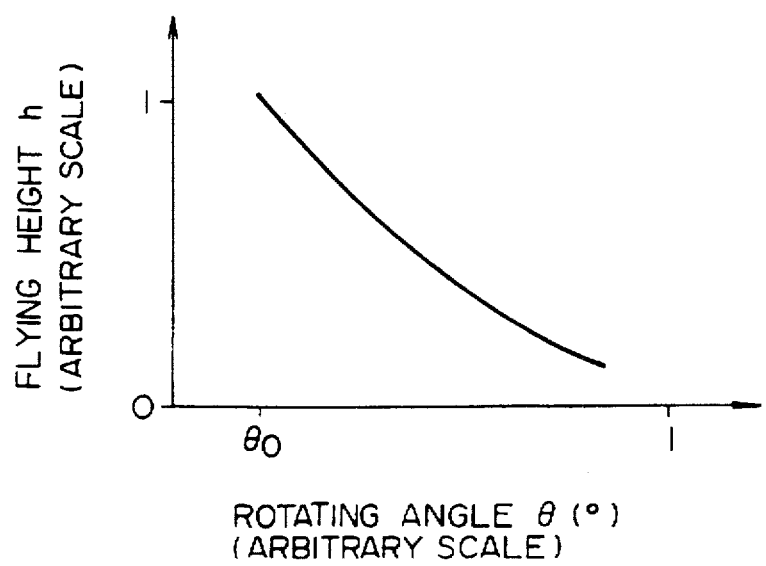
FIG. 10 is a graph showing the relationship between the rotational angle θ and the flying height of a magnetic head.

FIG. 9 shows the relationship between the rotational angle θ of the rotating means 5 and the head pressing load W. The value of W is zero when θ is less than the initial angle $\theta_0$, but it increases proportionally to θ in the region where $\theta > \theta_0$ holds, as shown in FIG. 9. On the other hand, the flying height h and the load W are related to each other such that the smaller the flying height h the larger the load W. Therefore, the relationship between the rotational angle θ and the flying height h is given as shown in FIG. 10, meaning that the flying height h can be regulated by controlling the rotational angle θ. Stated differently, since any desired flying height can be obtained by the present magnetic head supporting mechanism alone, the need of designing and developing new sliders which match with individual flying heights as is required in the prior art can be eliminated with the result of improved productivity.

While this embodiment is explained as using the rotating means 5 as control means for the flying height h, a similar operating effect can also be obtained by the use of moving means for moving the rigid arm 4 in a direction perpendicular to the surface of the magnetic disk 1.

When the magnetic head arranged on the free end of the support is moved toward the magnetic disk by any one of the rotating means or the moving means or the below-described deforming means using a piezoelectric element to adjust the gap between the magnetic head and the magnetic disk, this gap adjustment is usually performed so as to obtain a predetermined head output. However, if magnetic information on the magnetic disk is destroyed for some reason, the head output is not produced even when the gap is made substantially zero.

In such a case, the magnetic head is further pressed against the magnetic head by any of the above means, and therefore the magnetic head and the magnetic disk may suffer from severe damage. To avoid such an event, an adjusting method for the magnetic head supporting mechanism includes moving the magnetic head in a direction away from the magnetic disk when the head output is not produced even with the gap made substantially zero, thereby ensuring a long service life and high reliability of the magnetic head supporting mechanism.

Figure 11:
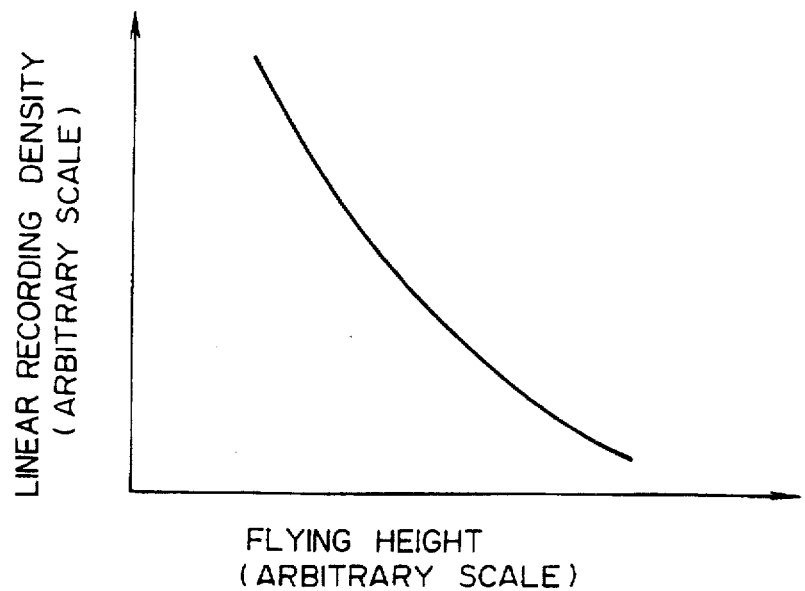
FIG. 11 is a graph showing the relationship between the flying height and linear recording density.

The relationship between the flying height and linear recording density is shown in FIG. 11. From the graph of FIG. 11, it will be found that the linear recording density increases as the flying height decreases.

If the magnetic disk surface is an ideal smooth surface (surface roughness hr ≈0), the linear recording density can be improved to increase storage capacity by setting the flying height to be substantially zero. Thus, by providing a sensor for detecting contact between the magnetic head and the magnetic disk and feeding back a sensor output to control the rotational angle, a very small flying height can be realized without causing contact. In other words, high-reliability, high-density recording can be achieved.

With this embodiment, since the air pressure adjusting means is formed by shaping the support itself, the slider which has been required as the air pressure adjusting means in the prior art can be dispensed with, and therefore the weight of the magnetic head supporting mechanism can be remarkably reduced. As a result, it is possible to reduce the contact force between the magnetic head and the magnetic disk to a large extent, and thus ensure a satisfactory service life, i.e., reliability, of the magnetic disk even under conditions (2) and (3) as set forth later.

More specifically, in the conventional magnetic head supporting mechanism, the slider serving as the air pressure adjusting means amounts to about 80% of the equivalent mass of the magnetic head. Therefore, in this embodiment, the equivalent mass of the magnetic head can be reduced down to less than 20% (⅕) of that in the prior art due to the absence of the slider. Correspondingly, the contact force between the magnetic head and the magnetic disk can be reduced down to less than 20% (⅕) of that in the prior art with the result of a satisfactory service life of the magnetic disk.

This embodiment enables the magnetic head to be operated under any of the below-described conditions (1), (2) and (3) by adjusting the head pressing load depending on the rotational angle θ. Specifically, under the condition (1), data can be read and written at any desired linear recording density by controlling the flying height depending on the angle θ.

Under the conditions (2) and (3), since the contact pressure can be controlled by regulating the angle θ, a satisfactory disk life can be ensured by setting the angle 6 so as to produce a small contact force.

Figure 12:
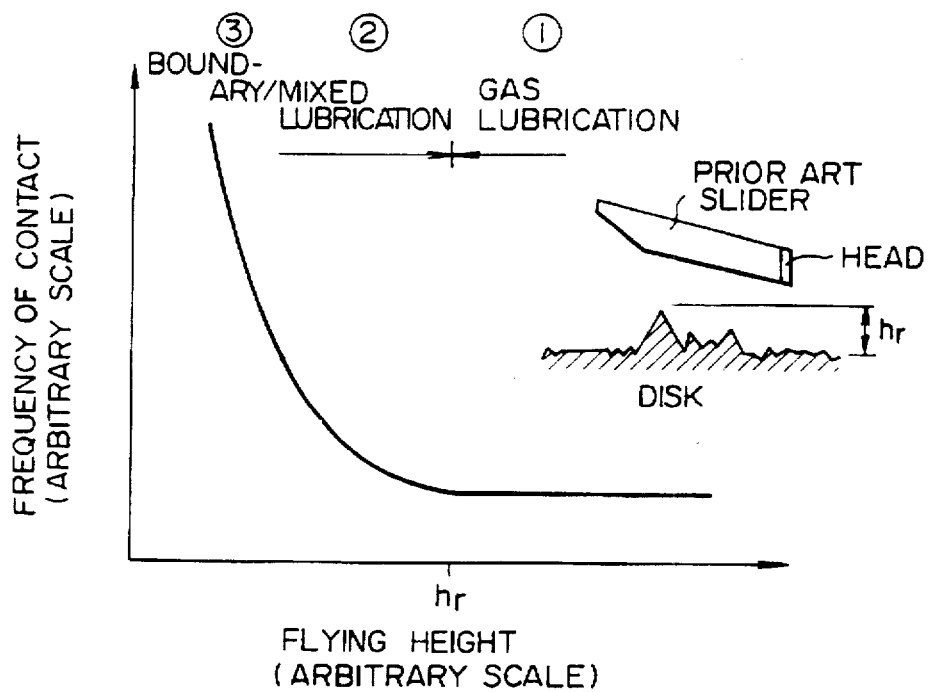
FIG. 12 is a graph showing the relationship between the flying height and frequency of contact.

On the other hand, as will be seen from FIG. 12 showing the relationship between the flying height and frequency of contact between the slider or magnetic head and the magnetic disk, the frequency of contact abruptly increases when the flying height becomes less than the surface roughness (hr) of the magnetic disk. Stated differently, when the flying height is larger than the surface roughness hr, all the head pressing load W is borne by the air film (positive pressure) created by relative movement between the magnetic head and the magnetic disk, but when the flying height is smaller than hr, W is borne by the air film and a lubricant coated on the surface of the magnetic head or the magnetic disk, or borne by the surface of the magnetic disk alone. Therefore, these three conditions may be called (1) gas lubrication, (2) mixed lubrication, and (3) boundary lubrication, respectively, for discrimination therebetween.

Figure 13:
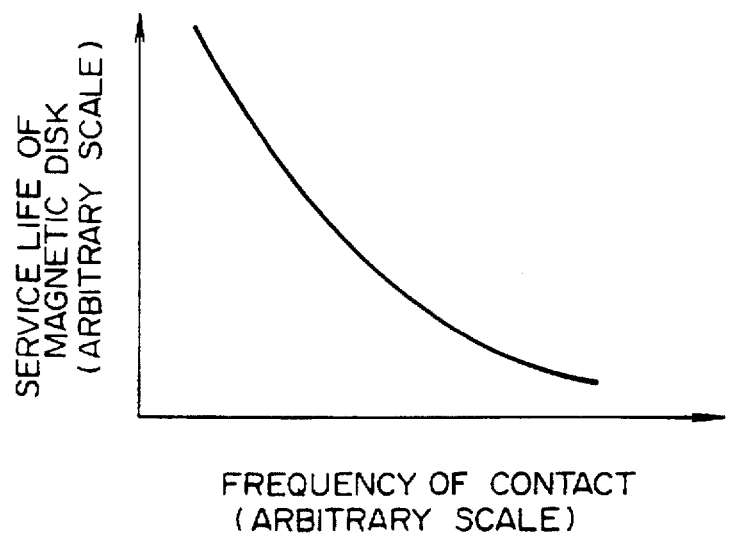
FIG. 13 is a characteristic graph showing the relationship between the frequency of contact and service life of the magnetic disk.
Figure 14:
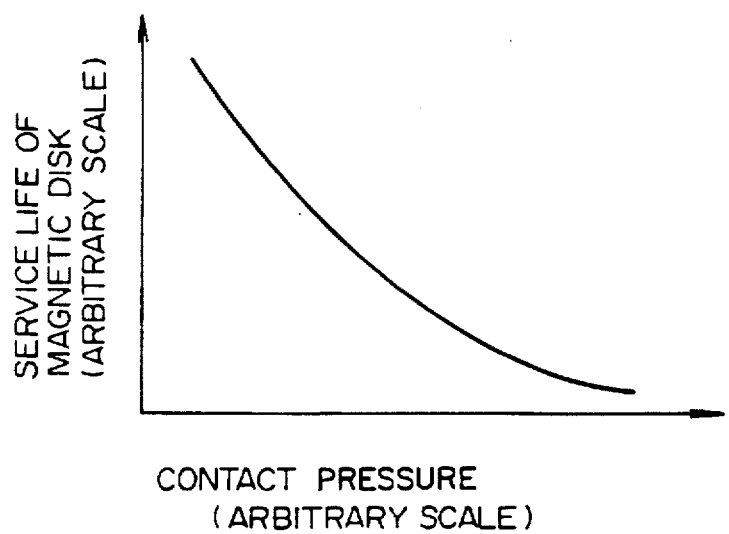
FIG. 14 is a characteristic graph showing the relationship between contact pressure (contact force) and the service life of the magnetic disk.

The relationship between the frequency of contact and the service life of the magnetic disk is shown in FIG. 13. From the graph of FIG. 13, it will be found that the service life of the magnetic disk abruptly decreases as the frequency of contact increases. For this reason, the conventional magnetic disk device has been designed so as to operate under the condition (1). Meanwhile, as will be seen from FIG. 14 showing the relationship between contact force (contact pressure) and the service life of the magnetic disk, it is possible to drastically prolong the service life of the magnetic disk with a small contact pressure. Therefore, a mechanism for ensuring a small and stable contact force must be provided to achieve the magnetic disk device (head supporting system) which operates under the conditions (2) and (3) for a high degree of linear recording density.

While the head supporting mechanism of this embodiment can be utilized under all the conditions (1), (2) and (3), it is particularly suitable for use under the condition (1). In practice, because the flying height can easily be changed by changing the rotational angle in this embodiment, the flying height is increased when the surface roughness hr of the magnetic disk is large, so that the contact between the magnetic head and the magnetic disk can be avoided to prevent data from being destroyed due to contact therebetween and thus ensure high reliability.

As disclosed in the above-cited Japanese Patent Examined Publication No. 57-569, the air film (positive pressure) created by relative movement between the positive pressure generating portion and the magnetic disk (based on the principles of dynamic air bearing) in this embodiment functions as an air spring which can make the magnetic head stably follow vibration of the magnetic disk and ensure the predetermined flying height. This permits stable read/write of data and eliminates malfunction die to vibration of the magnetic disk and the supporting mechanism.

In this embodiment, by providing four magnetic heads in the radial direction, the data access (seek) distance (i.e., the distance of movement in the radial direction of the magnetic disk) for each magnetic head is reduced down to ¼ of that in the case of using only one head. Therefore, high-speed access to magnetic data can be realized without specifically improving drive means (not shown) for moving the magnetic head in the radial direction of the magnetic disk. Further, since it is not necessary to provide a slider in this embodiment, the weight of the magnetic head supporting system can be reduced.

Thus, no special improvement in the drive means is required to achieve high-speed access. This advantageous effect becomes more significant as the number of magnetic heads increases. From this viewpoint, the supporting mechanism of the present invention is an optimum one for supporting a plurality of magnetic heads.

While stainless steel is used as a material of the support 3 in this embodiment, the support may be formed of a synthetic resin film, a film of fiber-reinforced synthetic resin or a thin plate of aluminum alloy and copper alloy, or may be formed into a flexible shape by using any one or a combination of ferrite, ferrite with MnZn added, $Al_2O_3$, an alumina-titanium composite such as $Al_2O_3.TiC$ and $Al_2O_3.TiO_2$, a zirconia-base ceramic such as $ZrO_2$ and $ZrB_2$, a silicon-base ceramic such as $SiC$ and $Si_3N_4$, diamond-like carbon, diamond, Si, and $SiO_2$, which have superior sliding-resistant characteristics. Additionally, the support may have a curved shape instead of a flat shape.

The metallic thin plate such as a stainless steel sheet is superior in easiness of machining and cost. The synthetic resin has a wide range of selections for the spring constant and is superior in sliding properties because of the small weight and hence the small contact force between the head and the disk. On the other hand, the aforesaid ferrite, aluminum compound and zirconia compound are very compatible with commercially available disks and are superior in sliding-resistant characteristics. The carbon material has a wide range of selections for the spring constant and is also superior in sliding-resistant characteristics. The silicon compound is superior in processing and thus advantageous in forming the air pressure adjusting means by micro processing.

The air pressure adjusting means shown in FIG. 8 is formed by directly shaping the support with a process of mechanical machining, an ion milling method or an etching method.

The air pressure adjusting means is constituted by the positive pressure generating portion 71, comprising the tapered portion 711, the flat portion 712, and the bleed portion 72, as explained before. The bleed portion 72 is recessed to have a depth of several ten to several hundred micrometers from the surface of the flat portion 712, and the tapered portion 711 is set to form an angle of about 1° or less with respect to the flat portion 712.

The magnetic head 2 is mounted on the magnetic head mounting portion 31 provided on the free end of the suspension (support) 30 almost perpendicularly with respect to the positive pressure generating portion 71. The gap between the magnetic head and the magnetic disk for detecting magnetic information recorded on the magnetic disk surface is formed to be substantially flush with the positive pressure generating portion.

Therefore, even when the flying height becomes zero for some reason and the air pressure adjusting means comes into contact with the disk, direct contact between the magnetic head and the disk is less likely to occur, whereby trouble such as damaging the magnetic head can be avoided. Further, since the weight of the suspension is small in this embodiment because of absence of the slider, as mentioned before, the contact force between the air pressure adjusting means and the disk is so small that if contact occurs, the data and the air pressure adjusting means will not be destroyed.

It is to be noted that while in this embodiment the support is formed of a member which has rigidity in a direction parallel to the magnetic disk surface and flexibility in a direction non-parallel to the magnetic disk over an entire area spanning from the portion held by the rigid arm to the free end, a similar effect can also be obtained by a support formed of a combination of a flexible member and a rigid member so that the force pressing the magnetic head against the magnetic disk may be produced due to an elastic deformation of only the flexible member.

Furthermore, a similar effect can also be obtained by a support having a substantially flat shape other than the curved shape illustrated in this embodiment. Additionally, a similar effect can also be obtained by a combination of the support in any modified shape, the gas pressure adjusting means, and the method of arranging the magnetic head on the free end of the support.

Figure 15:
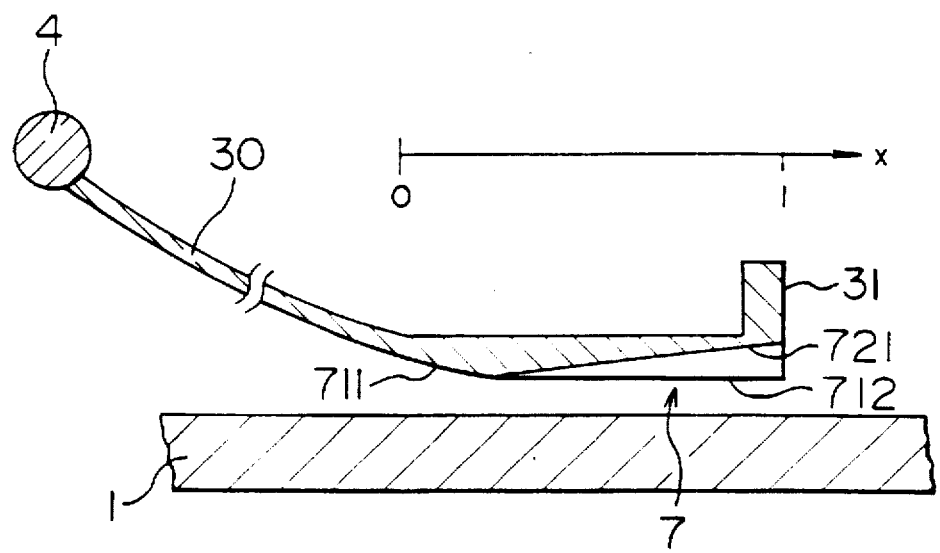
FIG. 15 is a cross-sectional view of a magnetic head support of a second embodiment of the invention.

A second embodiment of the present invention will be described with reference to FIGS. 15 to 18. As shown in FIG. 15, the magnetic disk device of this embodiment is different from the magnetic disk device of the first embodiment in that the bleed portion 72 of the air pressure adjusting means 7 is formed by a flat plane substantially parallel to the positive pressure generating portion 71 in the first embodiment, whereas the bleed portion 721 of the air pressure adjusting means 7 is formed to extend away from the positive pressure generating portion 712 while advancing from the tapered portion 711 toward the magnetic head attaching portion 31 in this embodiment.

In other words, a flow path defined by the magnetic disk and the bleed portion is enlarged as it proceeds in a direction from the tapered portion to the magnetic head attaching portion 31.

Figure 16:
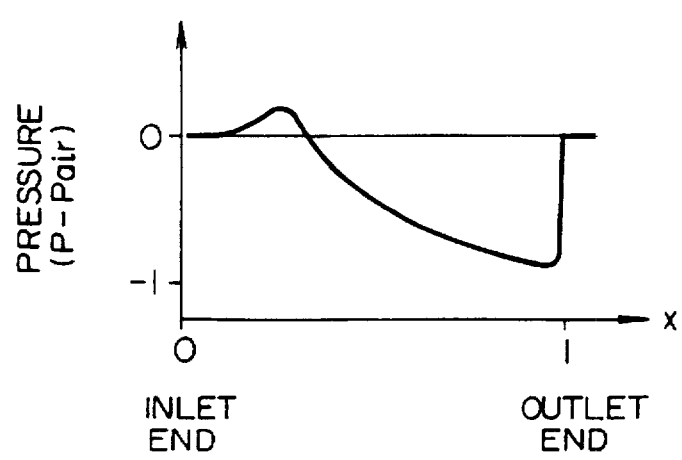
FIG. 16 is a graph showing a pressure distribution in a bleed portion of the second embodiment.

With such a configuration, the bleed portion produces a pressure lower than the atmospheric pressure (i.e., a negative pressure) as shown in FIG. 16. This negative pressure increases in proportion to a circumferential speed of the magnetic disk and acts as a pressing load by which the magnetic head is pressed against the magnetic disk. Therefore, a fraction of the pressing load to be imposed from the support for producing the rated pressing load can be reduced.

Figure 17:
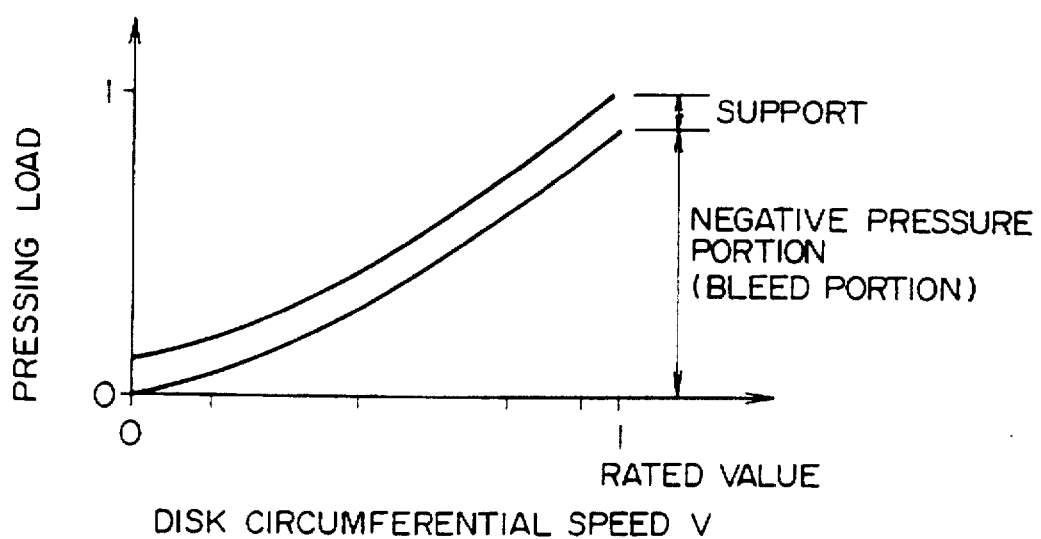
FIG. 17 is a characteristic graph showing the relationship between a disk circumferential speed and the head pressing load.
Figure 18:
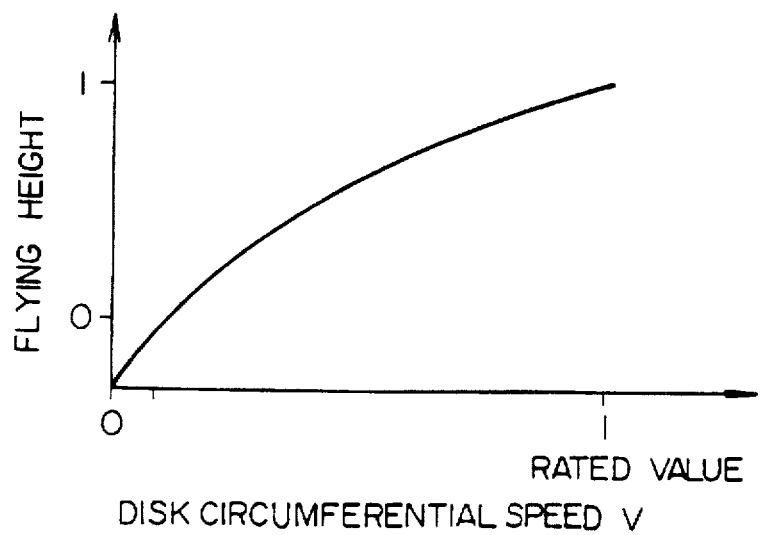
FIG. 18 is a graph showing the relationship between the disk circumferential speed and the flying height.

Specifically, as shown in FIG. 17, it is practical for the negative pressure to produce most of the rated pressing load and the support to produce the remaining load. This permits the pressing load to be set to a small pressing force applied from only the support immediately after the magnetic disk starts rotation, and to the rated load when the rated circumferential speed is reached. The relationship between the disk circumferential speed and the flying height is shown in FIG. 18. From the graph of FIG. 18, it will be found that when the circumferential speed is zero, the flying height also becomes zero and the positive pressure generating portion of the air pressure adjusting means is in contact with the magnetic disk.

As the rotational speed of the magnetic disk increases, the positive pressure generating portion of the air pressure adjusting means produces positive pressure. When a predetermined rotational speed for operation is reached, the air pressure adjusting means floats at a predetermined flying height at which the pressing load is balanced by the positive pressure. When the magnetic disk is stopped, the flying height becomes zero again, bringing the air pressure adjusting means and the magnetic disk into contact with each other.

In such an operation, usually called CS/S (Contact Start/Stop), the air pressure adjusting means contacts the magnetic disk immediately after the magnetic disk starts rotation and immediately before it stops rotation. One effective means for preventing damage due to the contact therebetween is to reduce the pressing load imposed on the magnetic head.

Thus, with this embodiment, the pressing load immediately after and before the start of rotation of the magnetic disk can be reduced so as to prevent damage due to the contact therebetween. Also, the small pressing load at the initial state results in superior flying characteristics with respect to the disk circumferential speed, bringing about such a feature that the air pressure adjusting means can fly above the magnetic disk at a low speed and the frequency (time) of contact between them is reduced. By virtue of the above advantage, the magnetic disk device of this embodiment is particularly superior in reliability.

Figure 19:
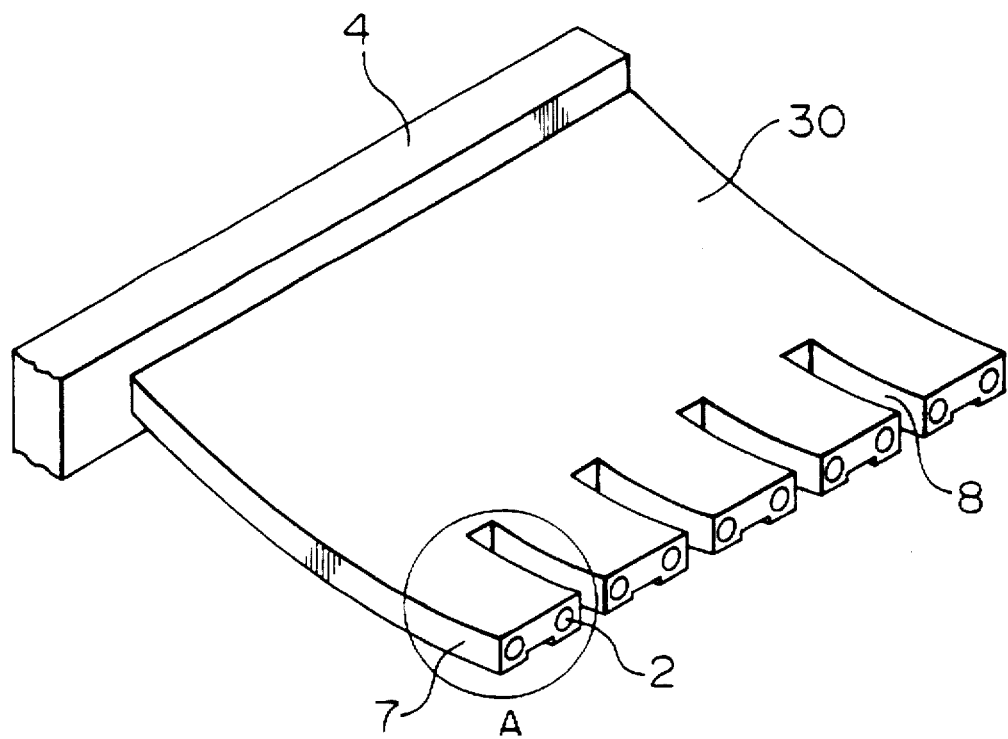
FIG. 19 is a perspective view of a magnetic head supporting mechanism of a third embodiment of the invention.

A third embodiment of the present invention will be described with reference to schematic views shown in FIGS. 19 to 22. As shown in FIG. 19, the magnetic disk device of this embodiment is different from the magnetic disk device of the first embodiment in that a cut-out 8 is provided between adjacent magnetic heads arranged on the free end of the support 3, allowing the magnetic heads 2 to move independently.

Figure 20:
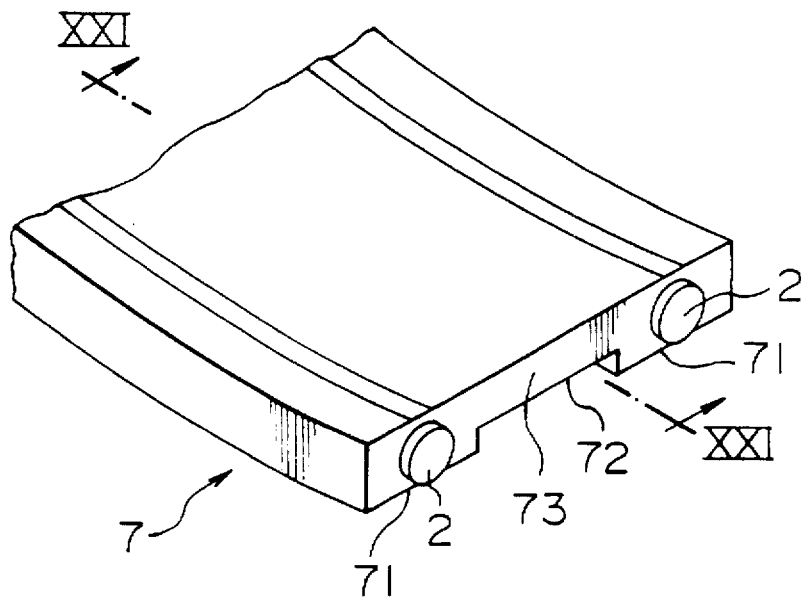
FIG. 20 is an enlarged view of a portion A in FIG. 19.

In this embodiment, as shown in FIG. 20, which is an enlarged view of a portion A in FIG. 19, a cut-out 8 is provided for every two magnetic heads. The two magnetic heads 2 constituting a magnetic head pair are arranged on an end face 73 of the air pressure adjusting means 7 comprising two positive pressure generating portions 71 and one bleed portion 72. This arrangement allows the magnetic head pair to faithfully follow the magnetic disk surface even when it is partly deformed, thereby ensuring a predetermined flying height. Further, an influence caused by such a deformation of the magnetic disk will not act on any other pairs of magnetic heads.

Figure 21:
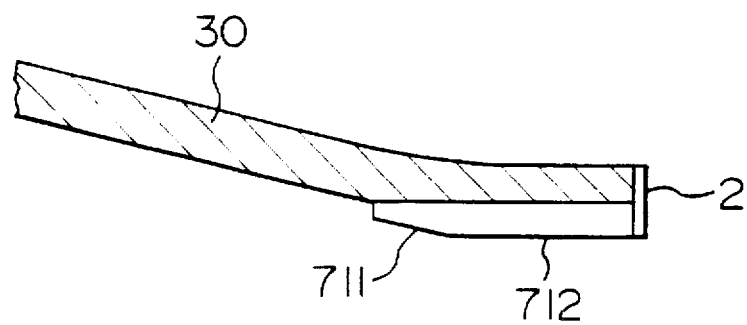
FIG. 21 is a cross-sectional view taken along the line XXI—XXI in FIG. 20.
Figure 22:
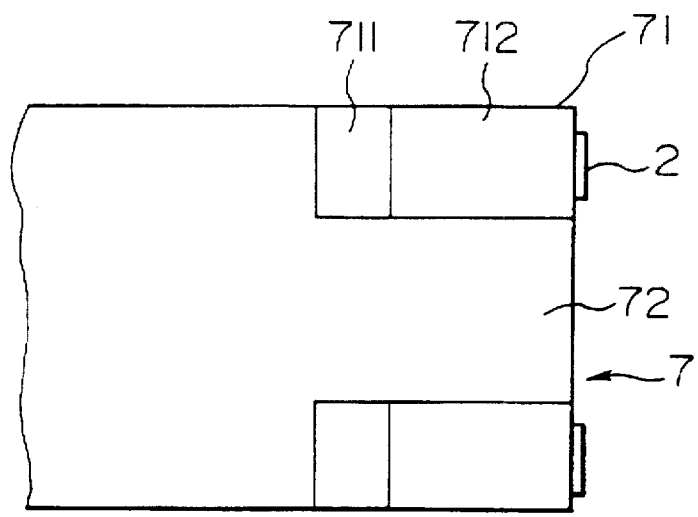
FIG. 22 is an explanatory view of the floating surface of the magnetic head support of the third embodiment.

As a result, a malfunction in reading and writing data can be avoided to realize the magnetic head supporting mechanism with high reliability. FIG. 21 shows a cross-section taken along the line XXI—XXI in FIG. 20 and FIG. 22 shows the floating surface of the support of this embodiment. By constituting one air pressure adjusting means 7 from two positive pressure generating portions 71 as shown in those drawings, the air pressure adjusting means 7 can have improved rolling rigidity.

More specifically, the positive pressure generating portions provided on both sides of the air pressure adjusting means 7 produce respective positive pressures which serve as two air springs to increase the rolling rigidity. Rolling vibration of the air pressure adjusting means 7 is thereby suppressed to enable less fluctuation in the flying height of the magnetic head.

Figure 23:
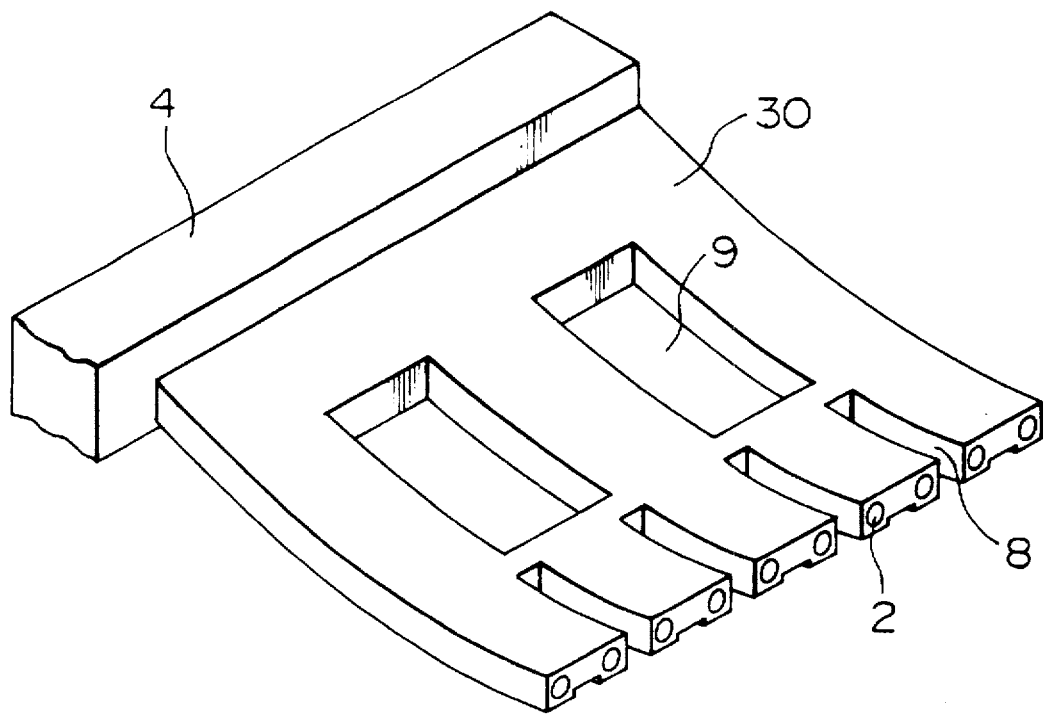
FIG. 23 is a perspective view of a magnetic head supporting mechanism of a fourth embodiment of the invention.

A fourth embodiment of the present invention will be described with reference to a schematic view shown in FIG. 23. As shown in FIG. 23, the magnetic disk device of this embodiment is different from the magnetic disk device of the third embodiment in that windows 9 are provided in the suspension 30 in this embodiment. With such an arrangement, the air flow generated by rotation of the magnetic disk can escape toward the rear side of the suspension while passing through the windows and the air pressure adjusting means is less subject to disturbance by fluid forces. Therefore, a fluctuation in the flying height of the magnetic head and an error in positioning thereof can be made smaller to improve reliability and hence recording density. More specifically, since the drag or reaction caused by the air flow is proportional to the area subjected to the air flow, it can be reduced down to about 60% in this embodiment where the area receiving the air flow is about 60% of that in the case of having no windows.

Figure 24:
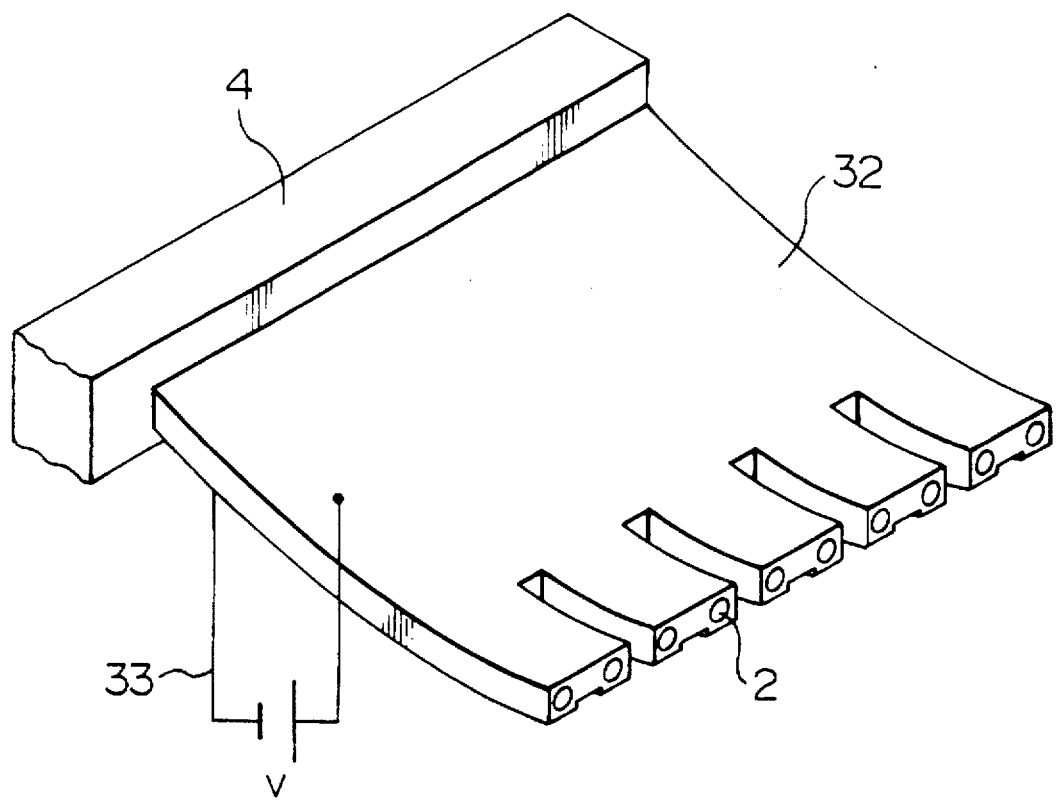
FIG. 24 is a perspective view of a magnetic head supporting mechanism of a fifth embodiment of the invention.
Figure 25:
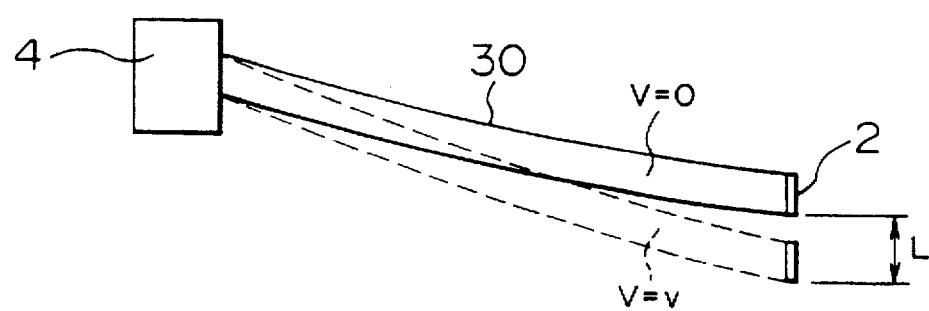
FIG. 25 is an explanatory view for operation of the fifth embodiment.

A fifth embodiment of the present invention will be described with reference to schematic views shown in FIGS. 24 and 25. As shown in FIG. 24, the magnetic disk device of this embodiment is different from the magnetic disk device of the third embodiment in that the support is formed of a synthetic resin with a piezoelectric element built therein. FIG. 25 is an explanatory view for operation of the support as a feature of this embodiment. When voltage is applied from voltage applying means 33 to a synthetic resin film 32 with a piezoelectric element built therein, the piezoelectric element is deformed, so that the support having the built-in piezoelectric element is flexed to move closer to or farther from the magnetic head than before application of the voltage.

Since the resulting movement distance L of the support is proportional to the applied voltage v, the movement distance L can be controlled by regulating the applied voltage v. This enables control of the flying height or the pressing load of the magnetic head with the applied voltage. As a result, the rotating means required in the first embodiment can be dispensed with and use of the piezoelectric element permits high-accuracy, quick-response control of the flying height.

By controlling the flying height accurately and quickly, it is possible to prevent a malfunction in a reading/writing operation as in the first embodiment and realize high-density recording.

Moreover, high-speed control of the flying height enables the magnetic head to follow vertical surges or the like of the magnetic disk having a low frequency, resulting in improved reliability. Additionally, since the magnetic head is out of contact with the magnetic disk when the latter is stopped and flies at a predetermined flying height when the magnetic disk reaches the predetermined rotational speed, contact damage between the magnetic head and the magnetic disk can be eliminated completely. It is thus possible to avoid contact damage immediately after and before rotation of the magnetic disk, and realize the magnetic disk device with high reliability.

Figure 26:
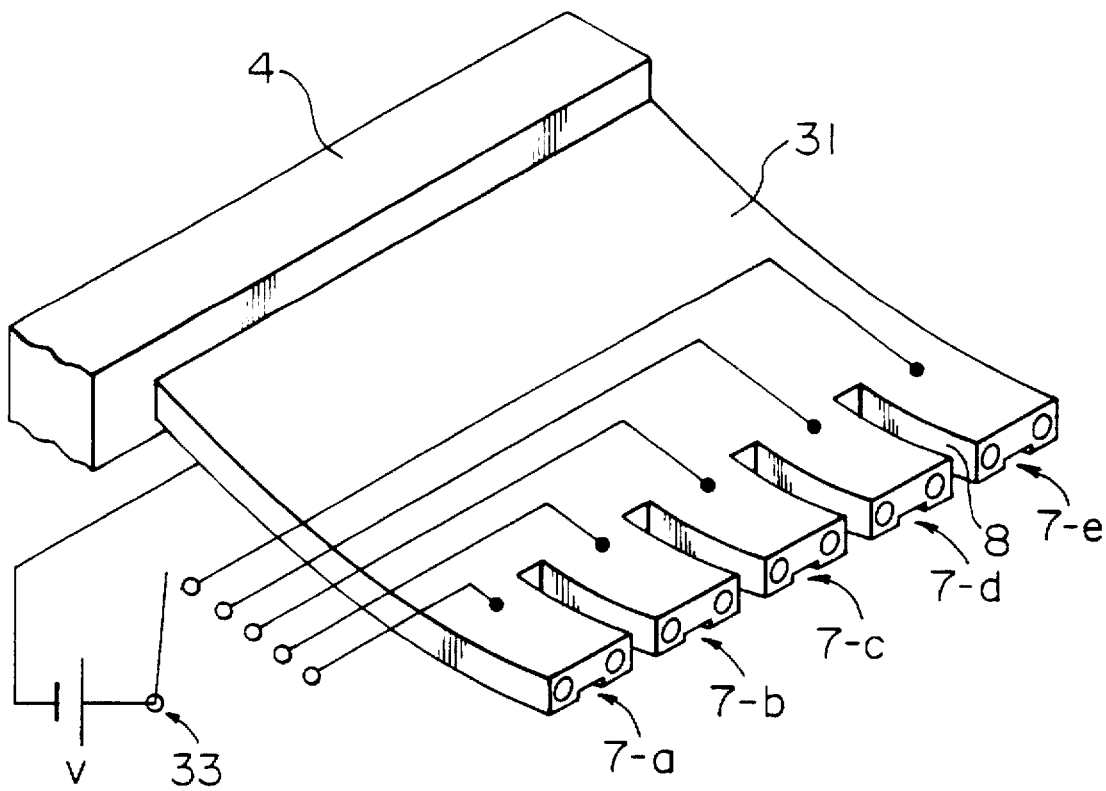
FIG. 26 is a perspective view of the magnetic head supporting mechanism of a sixth embodiment of the invention.

A sixth embodiment of the present invention will be described with reference to a schematic view shown in FIG. 26. The magnetic disk device of this embodiment is different from the magnetic disk device of the fifth embodiment in that the pairs of the magnetic heads arranged at the free end of the synthetic resin support and separated by the cut-outs 8 from each other are provided with independent piezoelectric elements and independent voltage applying means 33. This enables the flying heights of individual air pressure adjusting means (7-a to 7-e) to be controlled independently of one another. More specifically, the flying heights of the plural air pressure adjusting means provided in the radial direction of the magnetic disk become larger on the outer peripheral side where the disk exhibits a higher circumferential speed owing to the greater effect of dynamic air bearing.

However, the flying heights of the plural air pressure adjusting means provided in the radial direction desirably should be uniform from the viewpoint of magnetic recording characteristics. To realize this, for example, the voltage applied to the piezoelectric element provided in the air pressure adjusting means on the outer peripheral side of the magnetic disk is set to be larger than that applied to the piezoelectric element on the inner peripheral side. This causes the former piezoelectric element to produce a larger amount of movement of the magnetic head toward the magnetic disk (i.e., a decrease in the flying height) or the magnetic head pressing load so that all the magnetic heads have uniform flying heights.

As a result, a linear recording density can be made uniform irrespective of positions in the radial direction of the magnetic disk to improve the recording density.

If one magnetic head is damaged for some reason, the flying height of only the damaged magnetic head is increased as compared with those of the remaining normal magnetic heads to prevent the damaged magnetic head from generating dust due to continued sliding with the magnetic disk, or from destroying information on the magnetic disk.

Figure 27:
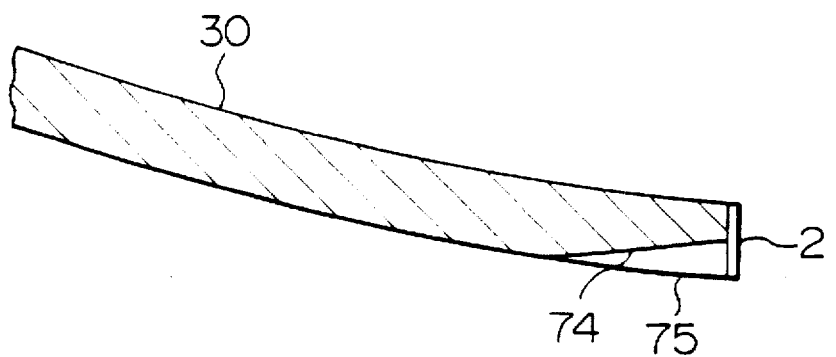
FIG. 27 is a cross-sectional view of a magnetic head support of a seventh embodiment of the invention.
Figure 28:
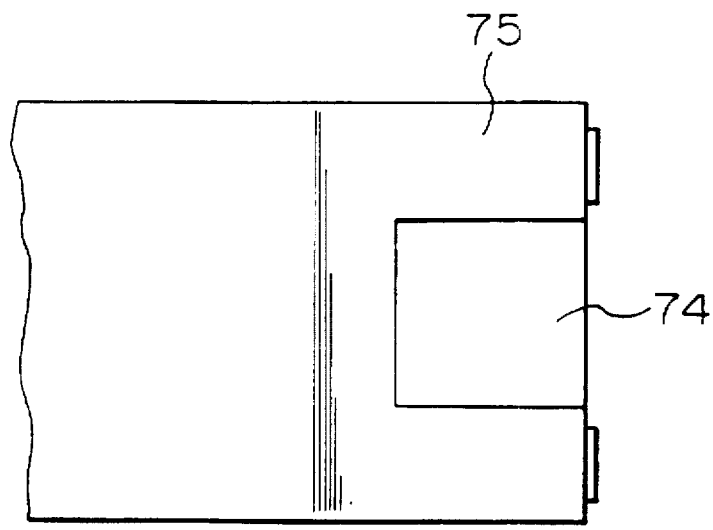
FIG. 28 is an explanatory view of the floating surface of the magnetic head support of the seventh embodiment.

A seventh embodiment of the present invention will be described with reference to FIGS. 27 and 28. In comparison with the magnetic disk device of the third embodiment wherein the bleed portion 72 formed in the support has no pressure adjusting function as will be seen from FIG. 21 showing the cross-section taken along the line XXI—XXI in FIG. 20, in this embodiment shown in FIGS. 27 and 28, the bleed portion 72 is replaced by a negative pressure generating portion 74 and the positive pressure generating portion 71 shown in FIGS. 20 and 21 is not specifically provided. In this embodiment, a suction force (negative pressure) produced in the negative pressure generating portion 74 can make the magnetic head faithfully follow the magnetic disk surface while contacting the latter (the flying height being substantially zero).

With the flying height being substantially zero, the recording density can be improved drastically. Since the magnetic head and the magnetic disk contact each other via sliding portions 75 and the core gap of each magnetic head is formed in a plane substantially flush with the sliding surface, the contact therebetween will not damage the magnetic head.

Also in this embodiment, since the air pressure adjusting means is formed by shaping the suspension itself as in the first or third embodiment, the weight of the sliding portions 75 of the suspension (i.e., its portions which contact the magnetic disk) is light and thus the contact force with the magnetic disk is small. In addition, by controlling the contact between the sliding portions and the magnetic disk by the magnetic disk rotating means, a smaller contact force can be realized. As stated before in connection with FIG. 14 showing the relationship between the contact force and the service life of the magnetic disk, the disk service life is prolonged at the small contact force so as to present satisfactory reliability.

Consequently, this embodiment makes it possible to drastically increase recording density with contact recording and ensure satisfactory reliability.

Figure 29:
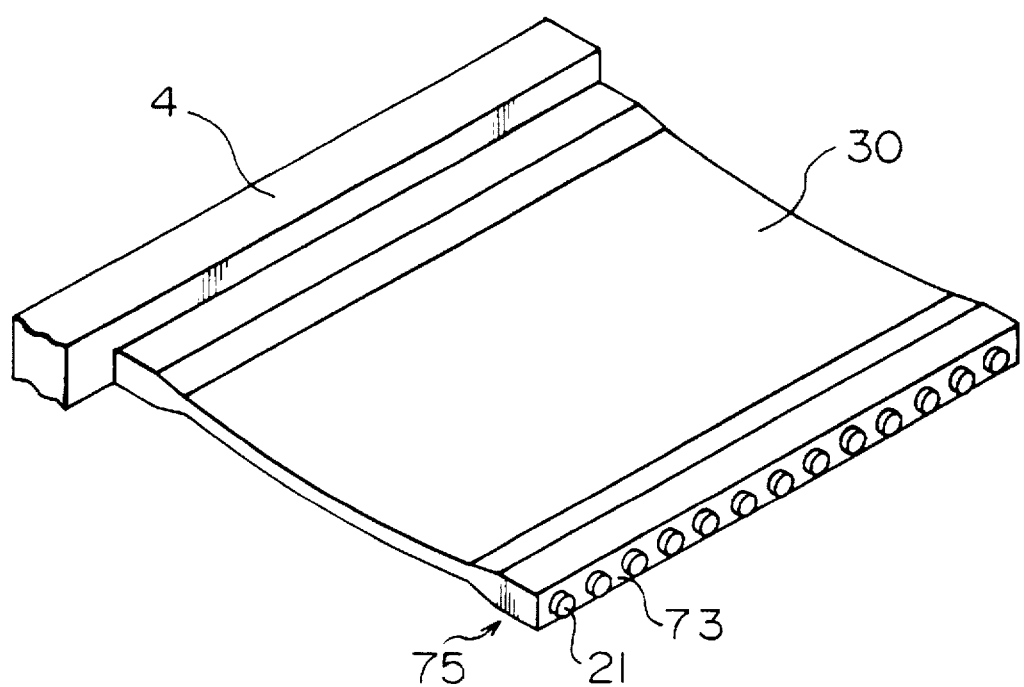
FIG. 29 is a perspective view of a magnetic head supporting mechanism of an eighth embodiment of the invention.
Figure 30:
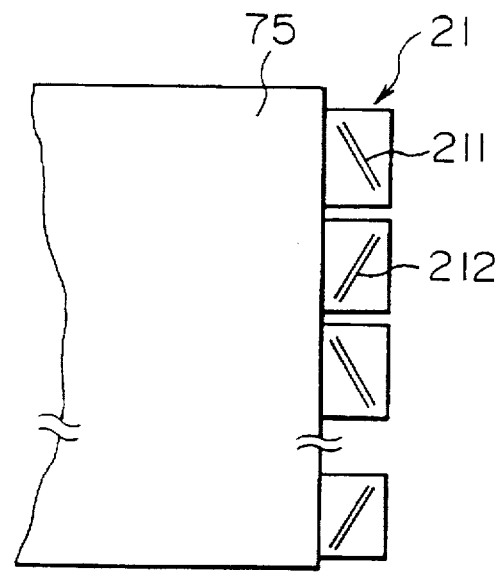
FIG. 30 is an enlarged view of the magnetic head of the eighth embodiment.

An eighth embodiment of the present invention will be described with reference to schematic views shown in FIGS. 29 and 30. The magnetic disk device of this embodiment is different from the magnetic disk device of the first embodiment in that adjacent magnetic heads 21 provided at the free end of the support as shown in FIG. 29 have their core gaps 211, 212 which are arranged at different angles as shown in FIG. 30 to perform so-called azimuth recording. With this arrangement, information written by the adjacent magnetic heads on the magnetic disk will not interface with each other, making it possible to narrow the spacing between adjacent magnetic heads and improve track density (i.e., recording density in the radial direction of the magnetic disk). Further, in this embodiment, the bleed portion provided in the first embodiment for higher track density is dispensed with to achieve higher-density packing of the magnetic heads.

Moreover, the surface of the suspension free end facing the magnetic disk serves as a sliding surface 75, and the suspension thickness is increased in both the proximal end portion fixed to the rigid arm 4 and the free end thereof to exhibit higher rigidity than the remaining portion, so that an anti-vibration effect during sliding motion may be increased. Additionally, the magnetic heads 21 are provided on the end face 73 of the suspension and the core gaps 211, 212 of the magnetic heads are formed to be substantially flush with the sliding surface for contact recording at a high recording density. For improving reliability, the magnetic heads are reduced in size and weight so that they may be provided on the end face of the suspension, which also contributes to a reduction in the contact force between the magnetic head and the magnetic disk.

Note that while the suspension in this embodiment has a larger thickness in both the proximal end portion fixed to the rigid arm 4 and the magnetic head mounting portion 31 at the free end thereof than the remaining portion, providing a higher rigidity portion than the remaining portion midway in the span from the rigid arm fixed portion to the free end of the suspension, preferably in the vicinity of the center, is effective to suppress vibration of the entire suspension due to sliding motion.

Figure 31:
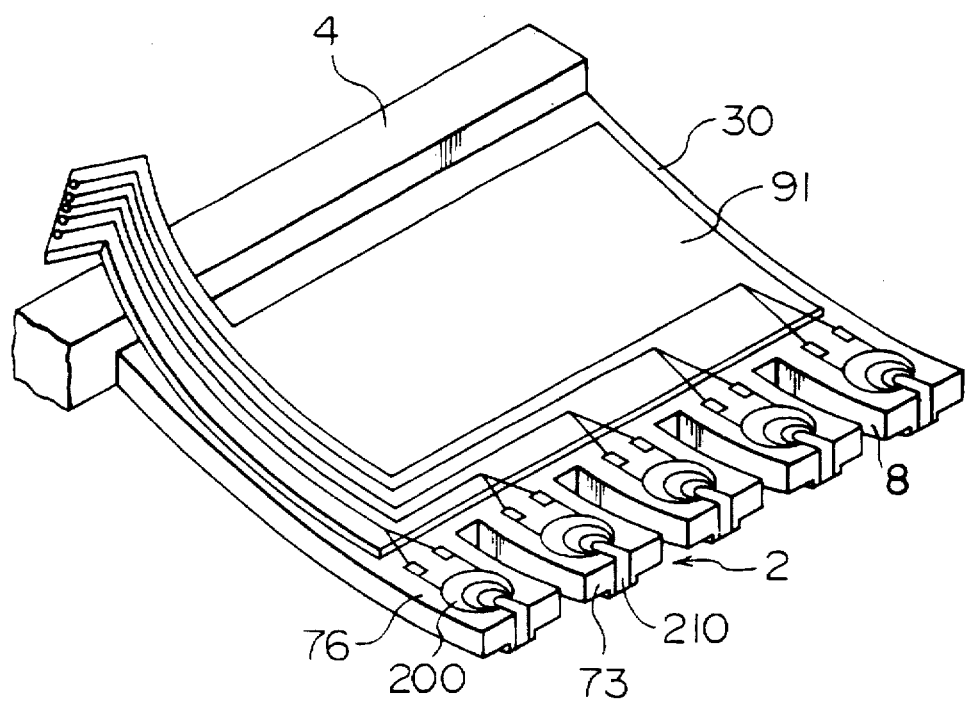
FIG. 31 is a perspective view of a magnetic head supporting mechanism of a ninth embodiment of the invention.
Figure 32:
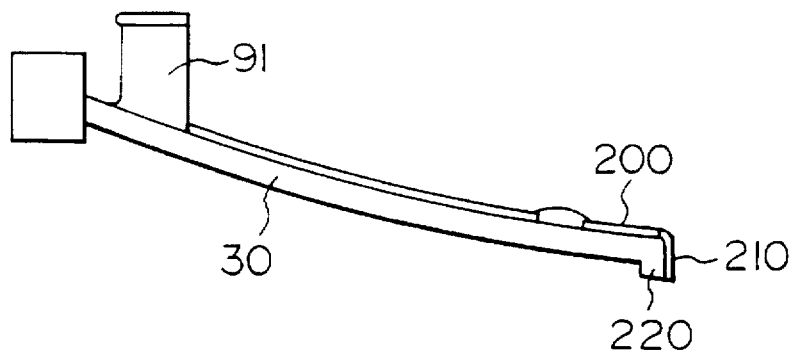
FIG. 32 is a side view of the magnetic head supporting mechanism of the ninth embodiment.

A ninth embodiment of the present invention will be described with reference to schematic views shown in FIGS. 31 and 32. The magnetic disk device of this embodiment is different from the magnetic disk device of the third embodiment in that, as shown in FIGS. 31 and 32, one magnetic head is mounted on each of suspension free ends separated by providing cut-outs 8 in the magnetic head supporting mechanism, a magnetic core 210 of the magnetic head is attached to a magnetic head mounting projection 220 on the end face 73, and further a coil 200 is disposed on a rear surface 76 opposite to the surface of the suspension free end facing the magnetic disk. With such an arrangement, the core gap of each magnetic head (i.e., the gap, not shown, at the distal end of the magnetic core 210) can surely contact the magnetic disk, making it possible to reliably detect magnetic information on the magnetic disk surface at a high density.

Further, since the coil for converting a detected leak field on the magnetic disk into a current is provided on the large rear surface 76 of the suspension, the number of windings of the coil can be increased so that even a small leak field may sufficiently be converted into a current. This also contributes to realization of high-density and high-reliability recording based on contact between the magnetic head and the magnetic disk.

Electrical wires leading from the magnetic heads are collected together into the FPC 91 and then led out to the outside of the supporting mechanism. While the FPC is provided on the suspension in this embodiment, it may also serve as part of the suspension.

Figure 33:
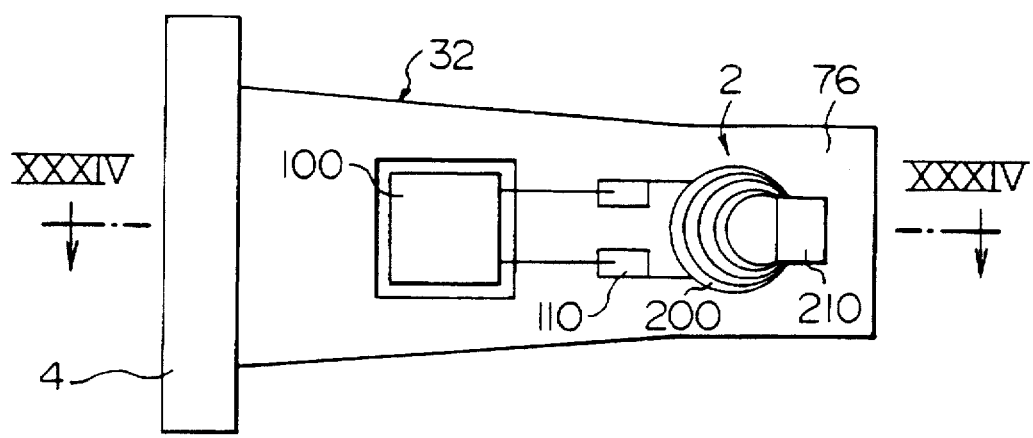
FIG. 33 is a front view of a magnetic head supporting mechanism of a tenth embodiment of the invention.

A tenth embodiment of the present invention will be described with reference to schematic views shown in FIGS. 33 to 36. In the magnetic disk device of this embodiment, as shown in FIG. 33, a support 32 of the magnetic head supporting mechanism is provided in the form of a thin plate or sheet made of a silicon compound to extend from a rigid arm 4, and the magnetic head 2 and an amplification circuit 100 for amplifying a signal from the magnetic head are disposed on the rear surface 76 of the support 32 facing the magnetic disk surface. Thus, in this embodiment, by utilizing the fact that the support 32 is made of a silicon compound, the amplification circuit 100 and an electrical circuit 110 for the magnetic head are directly formed on the support 32.

Figure 34:
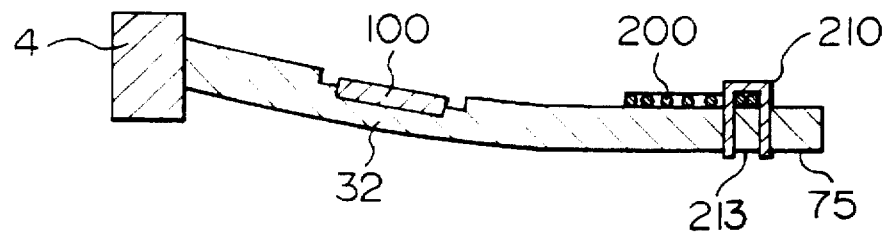
FIG. 34 is a cross-sectional view taken along the line XXXIV—XXXIV in FIG. 33.

With such an arrangement, an increase in the weight caused by separately providing an amplification circuit can be prevented and the signal from the magnetic head can be amplified before attenuation through a transfer path, making it possible to avoid malfunction of the magnetic head in reading/writing and improve recording density. FIG. 34 shows a cross-section taken along the line XXXIV—XXXIV in FIG. 33. As shown in FIG. 34, the magnetic core 210 of the magnetic head 2 is provided almost perpendicular to the rear surface 76 extending toward the sliding surface 75, and a core gap 213 at the distal end of the magnetic core 210 is formed to be substantially flush with the sliding surface 75.

Figure 35:
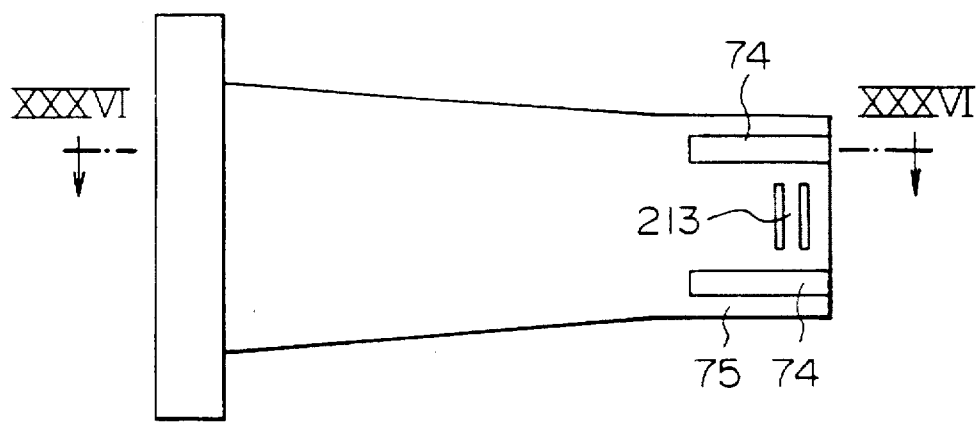
FIG. 35 is a view showing the sliding surface of the magnetic head support of the tenth embodiment.
Figure 36:
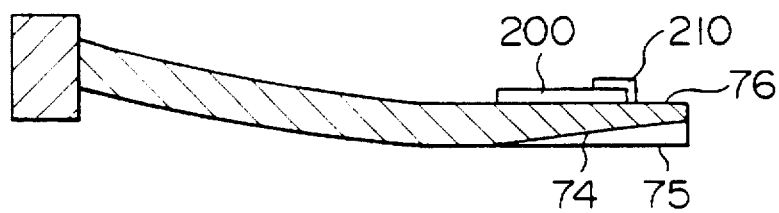
FIG. 36 is a cross-sectional view taken along the line XXXVI—XXXVI in FIG. 35.

Therefore, while the sliding surface slides over the magnetic disk, the magnetic core 210 and the coil 200 will produce no abrasion. FIG. 35 shows the sliding surface of the support of this embodiment and FIG. 36 shows a cross-section taken along the line XXXVI—XXXVI in FIG. 35. A pair of negative pressure generating portions 74 are provided on both sides of the core gap of the magnetic head as shown in FIG. 35, and each negative pressure generating portion 74 is shaped as shown in FIG. 36. The paired negative pressure generating portions 74 provided on both sides of the core gap function to make the magnetic head stably contact the magnetic disk. Thereby, high-density recording of high reliability can be realized.

The negative pressure generating portion 74 in this embodiment is shaped so as to increase the cross-sectional area of a flow path in a direction of a gas flow and, for example, has a wedge-like shape as shown in FIG. 36. But it may have a step-like shape. The magnetic circuit, the magnetic head, and the amplification circuit can be fabricated by using a semiconductor micro processing technique.

Figure 37:
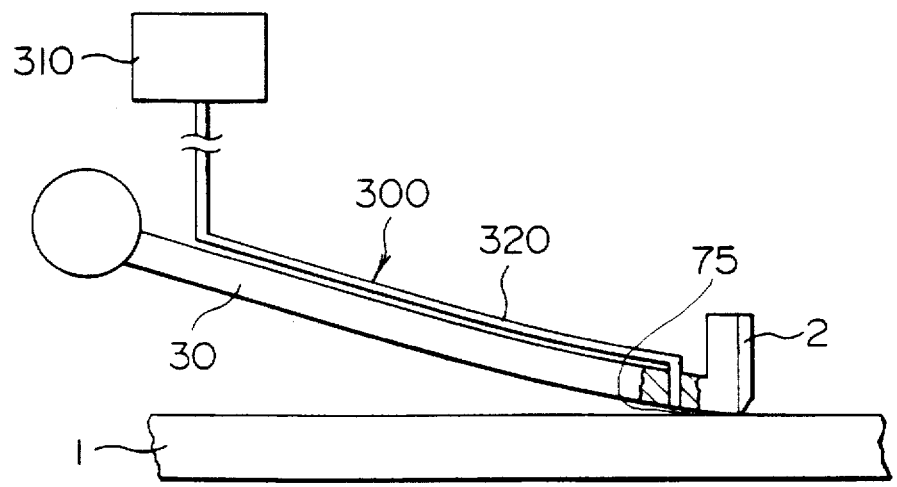
FIG. 37 is a side view of a magnetic head supporting mechanism of an eleventh embodiment of the invention.

An eleventh embodiment of the present invention will be described with reference to a schematic view shown in FIG. 37. The magnetic disk device of this embodiment is different from the magnetic disk device of the first embodiment in that the air pressure adjusting means and the bleed portion between the adjacent magnetic heads are not provided on the surface of the suspension free end facing the magnetic disk. In this embodiment, lubricating means 300 is provided on the suspension 30 extending to a position in the vicinity of the sliding portion 75. The lubricating means 300 comprises a lubricant tank 310 and piping 320.

Thus, even when the suspension comes into sliding contact with the magnetic disk, they indirectly contact each other via a lubricant with no possible contact damage of both the members. In this embodiment, therefore, high-density recording can easily be achieved with the high-reliability contact recording. Note that by selecting a material of the suspension and the contact pressure to meet optimum conditions, similar high-reliability contact recording between the magnetic head and the magnetic disk can also be realized without providing such lubricating means.

Figure 38:
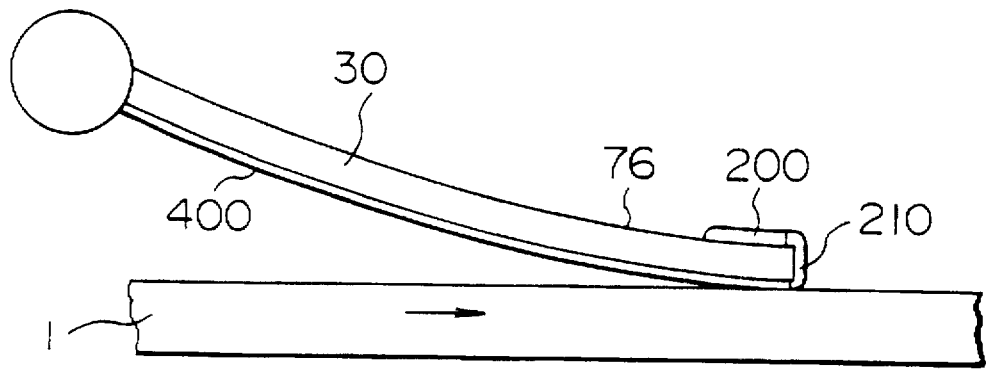
FIG. 38 is a side view of a magnetic head supporting mechanism of a twelfth embodiment of the invention.

A twelfth embodiment of the present invention will be described with reference to a schematic view shown in FIG. 38. The magnetic disk device of this embodiment is different from the magnetic disk device of the eleventh embodiment in that a protective film 400 is coated on the sliding surface of the suspension 30. This protective film functions like the lubricant to improve a sliding-resistant characteristic, thereby providing a similar effect as in the eleventh embodiment. Effective materials for the protective film include, for example, TiC, SiC, TiN.$MoS_2$, $Cr_2O_3$ and $Al_2O_3$.

Figure 39:
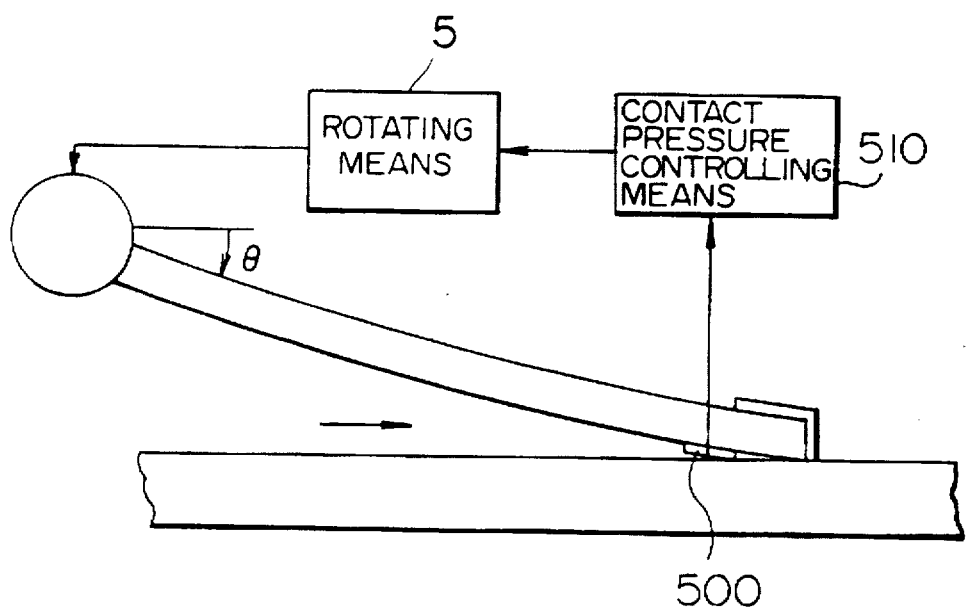
FIG. 39 is a side view of a magnetic head supporting mechanism of a thirteenth embodiment of the invention.

A thirteenth embodiment of the present invention will be described with reference to a schematic view shown in FIG. 39. In the magnetic disk device of this embodiment, a contact pressure sensor 500 is provided on the sliding surface of the suspension, and by referring to an output of the contact pressure sensor 500, θ is controlled by rotating means 5 through contact pressure controlling means 510 so as to obtain a predetermined value of the contact pressure. This enables realization of a stable and small contact pressure and hence contact recording with a superior sliding-resistant characteristic. Note that while the contact pressure is measured in this embodiment, a similar effect can also be obtained by detecting the contact force.

Figure 40:
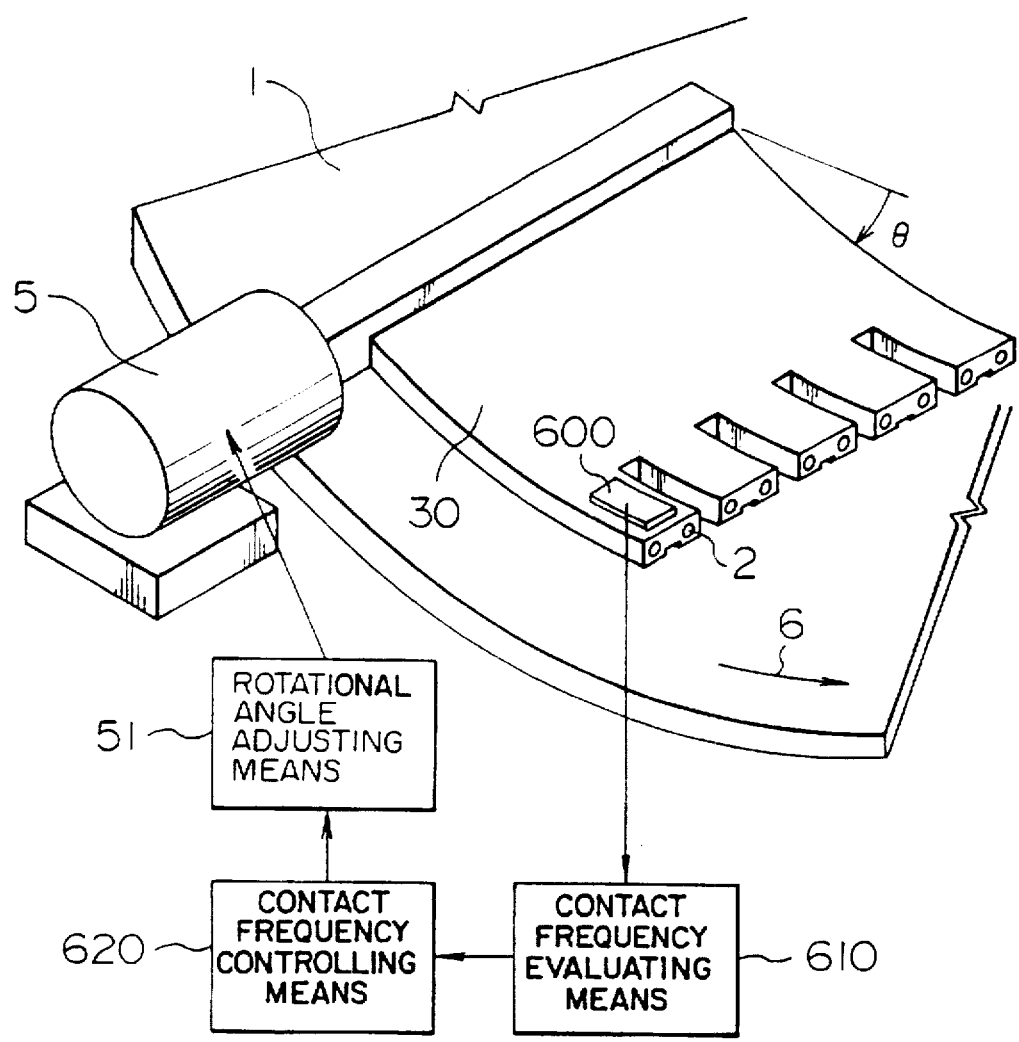
FIG. 40 is a perspective view of a magnetic head supporting mechanism of a fourteenth embodiment of the invention.

A fourteenth embodiment of the present invention will be described with reference to a schematic view shown in FIG. 40. In the magnetic disk device of this embodiment, contact detecting means 600 for detecting contact between the magnetic head and the magnetic disk is provided on the rear surface of the suspension 30. The contact detecting means 600 is connected to contact frequency evaluating means 610, contact frequency controlling means 620 and rotational angle adjusting means 51.

Because the frequency of contact and the service life of the magnetic disk are very closely related to each other, it is desirable for ensuring reliability to evaluate the contact frequency and keep the contact frequency below a predetermined value.

In this embodiment, the frequency of contact is evaluated by the contact frequency evaluating means 610, and the contact frequency controlling means 620 determines whether the resultant value is proper or not. If the frequency of contact is too great, the magnetic head pressing load is reduced by the rotating means 5 through the rotational angle adjusting means 51 so that the flying height is increased to lower the frequency of contact. As a result, the service life of the magnetic disk can be prolonged and high reliability can be ensured.

While high reliability is ensured in this embodiment by controlling the flying height with the frequency of contact as a parameter, the output of the magnetic head, dust density, or lubricant thickness on the magnetic disk surface may be used as a parameter instead of the frequency of contact.

As practical means for detecting those parameters, preferably, the frequency of contact is detected by an acoustic emission method, strain gauge method, or contact method; the contact pressure is detected by a strain gauge method, flexure angle method, or acceleration detecting method; the dust density is detected by a laser counter method; and the lubricant thickness on the magnetic disk surface is detected by a photoelectron emission method.

Alternatively, though not illustrated as an embodiment, the service life of the magnetic disk and the magnetic head can also be prolonged by providing rotation sensor means for detecting rotation of the magnetic disk, and effecting control by the aforesaid rotating means or moving means or deforming means including a piezoelectric element in such a manner that the magnetic head is maintained out of contact with the magnetic disk when the magnetic disk is stopped, and when the disk starts to rotate, the magnetic head approaches the magnetic disk until substantially zero distance is left therebetween.

Figure 41:
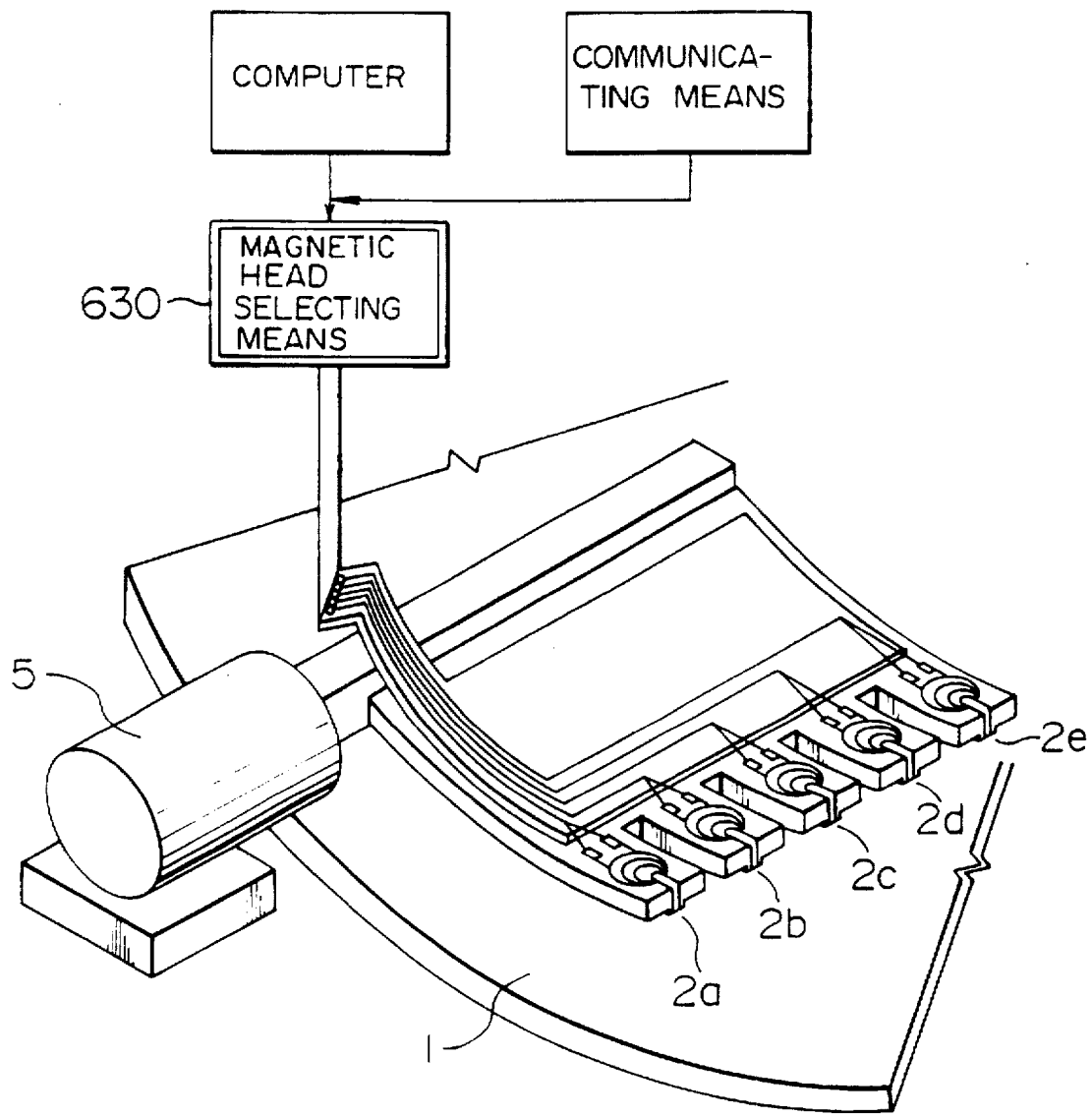
FIG. 41 is a perspective view of a magnetic head supporting mechanism of a fifteenth embodiment of the invention.

A fifteenth embodiment of the present invention will be described with reference to a schematic view shown in FIG. 41. In the magnetic disk device of this embodiment, magnetic head selecting means 630 is provided between each magnetic head and other units, for example, a computer and communicating means. This arrangement enables writing of data by a particular head or high-speed simultaneous writing of data by plural heads. As the number of heads increases, efficient selection of a proper head and multichanneling between each head and an external channel becomes more and more important.

The magnetic head selecting means 630 of this embodiment has not only the above function, but also a function of registering a failed head in a multi-head unit. By detecting those heads which have been damaged during use based on a read/write output and registering them one by one, it is always possible to select only high-reliability heads.

As described above, according to the present invention, since the support for supporting the magnetic head is itself shaped to form air pressure adjusting means, the weight of the magnetic head supporting mechanism can be reduced and many magnetic heads can be supported without significantly increasing the weight of the magnetic head supporting mechanism, with the result of realizing a magnetic disk device capable of high-speed access to data. For the above reason, even when the magnetic head and the magnetic disk are brought into contact with each other, damage of both the members and destruction of data can be avoided because of a small contact force.

Therefore, high-reliability and high-density recording can be realized even with a small flying height, including contact between the magnetic head and the magnetic disk. The air pressure adjusting means provided on the supporting mechanism creates an air spring between the magnetic head and the magnetic disk, thereby allowing the magnetic head to stably follow the magnetic disk surface.

Accordingly, a malfunction in reading/writing due to disk vibration can be avoided. Since the magnetic head supporting mechanism of the present invention can achieve any desired value of flying height by coupling the support of the magnetic head supporting mechanism to the rotating means to thereby adjust the rotational angle of the support, productivity is improved. The contact pressure can also be controlled, and realization of a small contact pressure enables a long service life and high reliability of the magnetic disk.

By selecting those materials which have superior sliding-resistant characteristics as the support material, the support can exhibit a superior sliding-resistant characteristic. Also, by using a silicon compound, the support itself can also serve as an electrical circuit or amplification circuit, resulting in an improvement of both productivity and recording density.

Finally, by providing lubricating means or a protective film on the surface of the support sliding on the magnetic disk, the sliding-resistant characteristic can be improved.

What is claimed is:

1. A magnetic disk device for reading information from a magnetic disk surface of a magnetic disk and for writing information on the magnetic disk surface, the magnetic disk device comprising:

an arm disposed at a distance from the magnetic disk surface;

a magnetic head support, the magnetic head support including a flexible member cantilevered to the arm, the flexible member having a first end attached to the arm and having a second end extending toward the magnetic disk surface; and at least one magnetic head disposed at the second end of the flexible member, the at least one magnetic head including a core having a gap, the gap being disposed at a surface of the flexible member facing toward the magnetic disk surface, and a coil wound around the core, the coil being disposed on a surface of the flexible member facing away from the magnetic disk surface.

2. A magnetic disk device according to claim 1, wherein the flexible member has rigidity in a direction parallel to the magnetic disk surface and flexibility in a direction non-parallel to the magnetic disk surface over an area of the flexible member extending from the first end of the flexible member to the second end of the flexible member.

3. A magnetic disk device according to claim 1, wherein a plurality of magnetic heads are disposed at the second end of the flexible member such that the magnetic heads are arranged along a line substantially parallel to the magnetic disk surface.

4. A magnetic disk device according to claim 1, wherein a portion of the surface of the flexible member facing toward the magnetic disk surface is in sliding contact with the magnetic disk surface during relative movement between the flexible member and the magnetic disk surface; and wherein the magnetic disk device further comprises one of a lubricant and a wear-resistant material disposed on the portion of the surface of the flexible member facing toward the magnetic disk surface.

5. A magnetic disk device according to claim 1, further comprising an amplification circuit for amplifying signals from the at least one magnetic head, the amplification circuit being disposed on the surface of the flexible member facing away from the magnetic disk surface;

wherein the flexible member is a single unitary flexible member made of a silicon compound.

6. A magnetic disk device according to claim 1, further comprising:

an actuator for rotating the arm so as to apply a force to the magnetic head support, thereby causing the at least one magnetic head to move toward or away from the magnetic disk surface;

detecting means for detecting one of (1) contact between the at least one magnetic head and the magnetic disk surface and (2) a flying height of the at least one magnetic head above the magnetic disk surface, based on an output signal of the at least one magnetic head produced when the at least one magnetic head reads information from the magnetic disk surface, and for producing a detection signal indicative of the detecting; and means for driving the actuator in response to the detection signal to control the force applied to the magnetic head support.

7. A magnetic disk-device according to claim 1, wherein the magnetic head support further includes a piezoelectric element for flexing the flexible member toward or away from the magnetic disk surface.

8. A magnetic disk device according to claim 1, further comprising a sealed case having the magnetic disk, the arm, the magnetic head support, and the at least one magnetic head disposed therein.

9. A magnetic disk device for reading information from a magnetic disk surface of a magnetic disk and for writing information on the magnetic disk surface, the magnetic disk device comprising:

an arm disposed at a distance from the magnetic disk surface;

a first magnetic head support, the first magnetic head support including a first flexible member cantilevered to the arm, the first flexible member having a first end attached to the arm and having a second end extending toward the magnetic disk surface;

a plurality of independent second magnetic head supports, each of the second magnetic head supports including a second flexible member, the second flexible member having a first end attached to the second end of the first flexible member and a second end extending toward the magnetic disk surface; and a plurality of magnetic heads, the magnetic heads being disposed on the second magnetic head supports such that at least one magnetic head is disposed at the second end of each second flexible member, each of the magnetic heads including a core having a gap, the gap being disposed at a surface of a respective second flexible member facing toward the magnetic disk surface, and a coil wound around the core, the coil being disposed on a surface of the respective second flexible member facing away from the magnetic disk surface.

10. A magnetic disk device according to claim 9, wherein the first flexible member and each second flexible member have rigidity in a direction parallel to the magnetic disk surface and flexibility in a direction non-parallel to the magnetic disk surface over an area of the flexible member extending from the first end of the flexible member to the second end of the flexible member.

11. A magnetic disk device according to claim 9, wherein the magnetic heads are disposed on the second magnetic head supports such that a plurality of magnetic heads are disposed at the second end of each second flexible member and such that all of the magnetic heads are arranged along a line substantially parallel to the magnetic disk surface.

12. A magnetic disk device according to claim 9, wherein a portion of the surface of each second flexible member facing toward the magnetic disk surface is in sliding contact with the magnetic disk surface during relative movement between each second flexible member and the magnetic disk surface; and wherein the magnetic disk device further comprises one of a lubricant and a wear-resistant material disposed on the portion of the surface of each second flexible member facing toward the magnetic disk surface.

13. A magnetic disk device according to claim 9, further comprising a plurality of amplification circuits for amplifying signals from respective ones of the magnetic heads, each of the amplification circuits being disposed on the surface of a respective second flexible member facing away from the magnetic disk surface;

wherein the first flexible member and each second flexible member are part of a single unitary flexible member made of a silicon compound.

14. A magnetic disk device according to claim 9, further comprising an actuator for rotating the arm so as to cause the magnetic heads to move toward or away from the magnetic disk surface.

15. A magnetic disk device according to claim 9, wherein the first magnetic head support further includes a piezoelectric element for flexing the first flexible member toward or away from the magnetic disk surface.

16. A magnetic disk device according to claim 9, wherein each of the second magnetic head supports further includes a piezoelectric element disposed between the first flexible member and the second flexible member for flexing the second flexible member toward or away from the magnetic disk surface.

17. A magnetic disk device according to claim 9, further comprising:

an actuator for rotating the arm so as to apply a force to the first magnetic head support, thereby causing the magnetic heads to move toward or away from the magnetic disk surface;

detecting means for detecting one of (1) contact between the magnetic heads and the magnetic disk surface and (2) a flying height of the magnetic heads above the magnetic disk surface, based on output signals of the magnetic heads produced when the magnetic heads read information from the magnetic disk surface, and for producing a detection signal indicative of the detecting; and means for driving the actuator in response to the detection signal to control the force applied to the first magnetic head support.

18. A magnetic disk device according to claim 9, further comprising a sealed case having the magnetic disk, the arm, the first magnetic head support, the second magnetic head supports, and the magnetic heads disposed therein.

19. A magnetic disk device for reading information from a magnetic disk surface of a magnetic disk and for writing information on the magnetic disk surface, the magnetic disk device comprising:

an arm disposed at a distance from the magnetic disk surface;

a magnetic head support, the magnetic head support including a flexible member cantilevered to the arm, the flexible member having a first end attached to the arm and having a second end extending toward the magnetic disk surface, the second end having a projection; and at least one magnetic head disposed on the projection, the at least one magnetic head including a core disposed on a surface of the projection, the core having a gap disposed at an edge of the projection facing toward the magnetic disk surface, and a coil wound around the core, the coil being disposed on the surface of the projection away from the edge facing toward the magnetic disk surface.

20. A magnetic disk device for reading information from a magnetic disk surface of a magnetic disk and for writing information on the magnetic disk surface, the magnetic disk device comprising:

an arm disposed at a distance from the magnetic disk surface;

a first magnetic head support, the first magnetic head support including a first flexible member cantilevered to the arm, the first flexible member having a first end attached to the arm and having a second end extending toward the magnetic disk surface;

a plurality of independent second magnetic head supports, each of the second magnetic head supports including a second flexible member, the second flexible member having a first end attached to the second end of the first flexible member and a second end extending toward the magnetic disk surface, the second end having a projection; and a plurality of magnetic heads, the magnetic heads being disposed on the second magnetic head supports such that at least one magnetic head is disposed on the projection of each second flexible member, each of the magnetic heads including a core disposed on a surface of the projection of a respective second flexible member, the core having a gap disposed at an edge of the projection facing toward the magnetic disk surface, and a coil wound around the core, the coil being disposed on the surface of the projection away from the edge facing toward the magnetic disk surface.

21. A magnetic disk device according to any one of claims 1–4, 6–8, or 19, wherein the flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

22. A magnetic disk device according to any one of claims 1–4, 6–8, or 19, wherein the flexible member is made of a material selected from the group consisting of stainless steel, aluminum alloy and copper alloy, a synthetic resin, and a fiber-reinforced synthetic resin.

23. A magnetic disk device according to any one of claims 9–12, 14–18, or 20, wherein each flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

24. A magnetic disk device according to any one of claims 9–12, 14–18, or 20, wherein each flexible member is made of a material selected from the group consisting of stainless steel, aluminum alloy and copper alloy, a synthetic resin, and a fiber-reinforced synthetic resin.

25. A magnetic head support device for a magnetic disk device, the magnetic disk device being for reading information from a magnetic disk surface of a magnetic disk and for writing information on the magnetic disk surface and including at least one magnetic head, the magnetic head support device comprising:

an arm disposed at a distance from the magnetic disk surface; and a magnetic head support, the magnetic head support including a flexible member cantilevered to the arm, the flexible member having a first end attached to the arm and having a second end extending toward the magnetic disk surface;

wherein when the magnetic head support device is used in the magnetic disk device, the at least one magnetic head is disposed at the second end of the flexible member, the at least one magnetic head including
a core having a gap, the gap being disposed at a surface of the flexible member facing toward the magnetic disk surface, and
a coil wound around the core, the coil being disposed on a surface of the flexible member facing away from the magnetic disk surface.

26. A magnetic head support device for a magnetic disk device, the magnetic disk device being for reading information from a magnetic disk surface of a magnetic disk and for writing information on the magnetic disk surface and including at least one magnetic head, the magnetic head support device comprising:

an arm disposed at a distance from the magnetic disk surface; and a magnetic head support, the magnetic head support including a flexible member cantilevered to the arm, the flexible member having a first end attached to the arm and having a second end extending toward the magnetic disk surface, the second end having a projection;

wherein when the magnetic head support device is used in the magnetic disk device, the at least one magnetic head is disposed on the projection, the at least one magnetic head including
a core disposed on a surface of the projection, the core having a gap disposed at an edge of the projection facing toward the magnetic disk surface, and
a coil wound around the core, the coil being disposed on the surface of the projection away from the edge facing toward the magnetic disk surface.

27. A magnetic head support device according to claim 19 or 26, wherein the flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

28. A magnetic head support device according to either claim 19 or 26, wherein the flexible member is made of a material selected from the group consisting of stainless steel, aluminum alloy and copper alloy, a synthetic resin, and a fiber-reinforced synthetic resin.

29. A magnetic head support device for a magnetic disk device, the magnetic disk device being for reading information from a magnetic disk surface of a magnetic disk and for writing information on the magnetic disk surface and including a plurality of magnetic heads, the magnetic head support device comprising:

an arm disposed at a distance from the magnetic disk surface;

a first magnetic head support, the first magnetic head support including a first flexible member cantilevered to the arm, the first flexible member having a first end attached to the arm and having a second end extending toward the magnetic disk surface; and a plurality of independent second magnetic head supports, each of the second magnetic head supports including a second flexible member, the second flexible member having a first end attached to the second end of the first flexible member and a second end extending toward the magnetic disk surface;

wherein when the magnetic head support device is used in the magnetic disk device, the magnetic heads are disposed on the second magnetic head supports such that at least one magnetic head is disposed at the second end of each second flexible member, each of the magnetic heads including
a core having a gap, the gap being disposed at a surface of a respective second flexible member facing toward the magnetic disk surface, and
a coil wound around the core, the coil being disposed on a surface of the respective second flexible member facing away from the magnetic disk surface.

30. A magnetic head support device for a magnetic disk device, the magnetic disk device being for reading information from a magnetic disk surface of a magnetic disk and for writing information on the magnetic disk surface and including a plurality of magnetic heads, the magnetic head support device comprising:

an arm disposed at a distance from the magnetic disk surface;

a first magnetic head support, the first magnetic head support including a first flexible member cantilevered to the arm, the first flexible member having a first end attached to the arm and having a second end extending toward the magnetic disk surface; and a plurality of independent second magnetic head supports, each of the second magnetic head supports including a second flexible member, the second flexible member having a first end attached to the second end of the first flexible member and a second end extending toward the magnetic disk surface, the second end having a projection;

wherein when the magnetic head support device is used in the magnetic disk device, the magnetic heads are disposed on the second magnetic head supports such that at least one magnetic head is disposed on the projection of each second flexible member, each of the magnetic heads including
a core disposed on a surface of the projection of a respective second flexible member, the core having a gap disposed at an edge of the projection facing toward the magnetic disk surface, and
a coil wound around the core, the coil being disposed on the surface of the projection away from the edge facing toward the magnetic disk surface.

31. A magnetic head support device according to claim 29 or 30, wherein each flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

32. A magnetic head support device according to claim 29 or 30, wherein each flexible member is made of a material selected from the group consisting of stainless steel, aluminum alloy and copper alloy, a synthetic resin, and a fiber-reinforced synthetic resin.

33. A magnetic head support member for a magnetic disk device, the magnetic disk device being for reading information from a magnetic disk surface of a magnetic disk and for writing information on the magnetic disk surface and including an arm disposed at a distance from the magnetic disk surface and at least one magnetic head, the magnetic head support member comprising:
- a magnetic head support including a flexible member having a first end and a second end;
- wherein when the magnetic head support member is used in the magnetic disk device, the flexible member is cantilevered to the arm such that the first end of the flexible member is attached to the arm and the second end of the flexible member extends toward the magnetic disk surface, and the at least one magnetic head is disposed at the second end of the flexible member, the at least one magnetic head including
  - a core having a gap, the gap being disposed at a surface of the flexible member facing toward the magnetic disk surface, and
  - a coil wound around the core, the coil being disposed on a surface of the flexible member facing away from the magnetic disk surface.

34. A magnetic head support member for a magnetic disk device, the magnetic disk device being for reading information from a magnetic disk surface of a magnetic disk and for writing information on the magnetic disk surface and including an arm disposed at a distance from the magnetic disk surface and at least one magnetic head, the magnetic head support member comprising:
- a magnetic head support including a flexible member having a first end and a second end, the second end having a projection;
- wherein when the magnetic head support member is used in the magnetic disk device, the flexible member is cantilevered to the arm such that the first end of the flexible member is attached to the arm and the second end of the flexible member extends toward the magnetic disk surface, and the at least one magnetic head is disposed on the projection, the at least one magnetic head including
  - a core disposed on a surface of the projection, the core having a gap disposed at an edge of the projection facing toward the magnetic disk surface, and
  - a coil wound around the core, the coil being disposed on the surface of the projection away from the edge facing toward the magnetic disk surface.

35. A magnetic head support member according to claim 33 or 34, wherein the flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

36. A magnetic head support member according to claim 33 or 34, wherein the flexible member is made of a material selected from the group consisting of stainless steel, aluminum alloy and copper alloy, a synthetic resin, and a fiber-reinforced synthetic resin.

37. A magnetic head support member for a magnetic disk device, the magnetic disk device being for reading information from a magnetic disk surface of a magnetic disk and for writing information on the magnetic disk surface and including an arm disposed at a distance from the magnetic disk surface and a plurality of magnetic heads, the magnetic head support member comprising:
- a first magnetic head support including a first flexible member having a first end and a second end; and
- a plurality of independent second magnetic head supports, each of the second magnetic head supports including a second flexible member, the second flexible member having a first end attached to the second end of the first flexible member and a second end;
- wherein when the magnetic head support member is used in the magnetic disk device, the first flexible member is cantilevered to the arm such that the first end is attached to the arm and the second end extends toward the magnetic disk surface, the second end of each second flexible member extends toward the magnetic disk surface, and the magnetic heads are disposed on the second magnetic head supports such that at least one magnetic head is disposed at the second end of each second flexible member, each of the magnetic heads including
  - a core having a gap, the gap being disposed at a surface of a respective second flexible member facing toward the magnetic disk surface, and
  - a coil wound around the core, the coil being disposed on a surface of the respective second flexible member facing away from the magnetic disk surface.

38. A magnetic head support member for a magnetic disk device, the magnetic disk device being for reading information from a magnetic disk surface of a magnetic disk and for writing information on the magnetic disk surface and including an arm disposed at a distance from the magnetic disk surface and a plurality of magnetic heads, the magnetic head support member comprising:
- a first magnetic head support including a first flexible member having a first end and a second end; and
- a plurality of independent second magnetic head supports, each of the second magnetic head supports including a second flexible member, the second flexible member having a first end attached to the second end of the first flexible member and a second end, the second end having a projection;
- wherein when the magnetic head support member is used in the magnetic disk device, the first flexible member is cantilevered to the arm such that the first end is attached to the arm and the second end extends toward the magnetic disk surface, the second end of each second flexible member extends toward the magnetic disk surface, and the magnetic heads are disposed on the second magnetic head supports such that at least one magnetic head is disposed on the projection of each second flexible member, each of the magnetic heads including
  - a core disposed on a surface of the projection of a respective second flexible member, the core having a gap disposed at an edge of the projection facing toward the magnetic disk surface, and
  - a coil wound around the core, the coil being disposed on the surface of the respective second flexible member away from the edge facing toward the magnetic disk surface.

39. A magnetic head support member according to claim 37 or 38, wherein each flexible member is made of at least one material selected from the group consisting of ferrite, ferrite with MnZn added, $Al_2O_3$, an alumina-titanium composite, a zirconia-base ceramic, a silicon-base ceramic, diamond-like carbon, diamond, Si, and $SiO_2$.

40. A magnetic head support member according to claim 37 or 38, wherein each flexible member is made of a material selected from the group consisting of stainless steel, aluminum alloy and copper alloy, a synthetic resin, and a fiber-reinforced synthetic resin.

* * * * *